US012747333B2

(12) United States Patent
Shih

(10) Patent No.: US 12,747,333 B2
(45) **Date of Patent: *Sep. 29, 2026**

(54) BIODEGRADABLE COMPOSITIONS AND ARTICLES MADE FROM CELLULOSE ACETATE

(71) Applicant: Eastman Chemical Company, Kingsport, TN (US)

(72) Inventor: Wayne Ken Shih, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 862 days.

This patent is subject to a terminal disclaimer.

(21) Appl. No.: 17/759,109

(22) PCT Filed: Jan. 20, 2021

(86) PCT No.: PCT/US2021/014080

§ 371 (c)(1),
(2) Date: Jul. 20, 2022

(87) PCT Pub. No.: WO2021/150542

PCT Pub. Date: Jul. 29, 2021

(65) Prior Publication Data

US 2023/0064720 A1 Mar. 2, 2023

Related U.S. Application Data

(60) Provisional application No. 62/706,274, filed on Aug. 7, 2020, provisional application No. 63/051,942, filed on Jul. 15, 2020, provisional application No. 62/963,313, filed on Jan. 20, 2020.

(51) Int. Cl.

| | |
|---|---|
| ***C08J 9/00*** | (2006.01) |
| ***C08J 9/08*** | (2006.01) |
| ***C08J 9/12*** | (2006.01) |
| ***C08J 9/14*** | (2006.01) |
| ***C08J 9/34*** | (2006.01) |
| ***C08K 3/26*** | (2006.01) |
| ***C08K 5/00*** | (2006.01) |
| ***C08K 5/11*** | (2006.01) |
| ***C08L 1/12*** | (2006.01) |
| ***C08L 67/02*** | (2006.01) |
| ***C08L 67/04*** | (2006.01) |

(52) U.S. Cl.

CPC ............... *C08K 5/11* (2013.01); *C08J 9/0023* (2013.01); *C08J 9/0061* (2013.01); *C08J 9/0066* (2013.01); *C08J 9/0085* (2013.01); *C08J 9/0095* (2013.01); *C08J 9/08* (2013.01); *C08J 9/122* (2013.01); *C08J 9/141* (2013.01); *C08J 9/34* (2013.01); *C08K 5/0033* (2013.01); *C08K 5/005* (2013.01); *C08L 1/12* (2013.01); *C08J 2203/02* (2013.01); *C08J 2203/06* (2013.01); *C08J 2203/14* (2013.01); *C08J 2300/16* (2013.01); *C08J 2301/12* (2013.01); *C08K 2003/265* (2013.01); *C08K 2201/018* (2013.01); *C08L 2201/06* (2013.01)

(58) Field of Classification Search

CPC ................................................ C08K 2201/018
See application file for complete search history.

(56) References Cited

U.S. PATENT DOCUMENTS

| | | | | |
|---|---|---|---|---|
| 4,180,536 | A | 12/1979 | Howell, Jr. et al. | |
| 5,970,988 | A | 10/1999 | Buchanan et al. | |
| 6,221,924 | B1 | 4/2001 | Mori et al. | |
| 6,571,802 | B1 | 6/2003 | Yamashita | |
| 10,518,444 | B2 | 12/2019 | Pawloski et al. | |
| 2008/0146686 | A1* | 6/2008 | Handa ...................... | C08J 9/142 521/58 |
| 2008/0281010 | A1 | 11/2008 | Lefas et al. | |
| 2014/0030521 | A1* | 1/2014 | Reedy ........................ | C08J 9/08 521/143 |
| 2022/0185978 | A1* | 6/2022 | Zhang ........................ | C08J 9/04 |
| 2024/0352235 | A1* | 10/2024 | Shih ........................ | B29C 48/67 |

FOREIGN PATENT DOCUMENTS

| | | | | | |
|---|---|---|---|---|---|
| JP | 2001011220 | A | * | 1/2001 | |
| JP | 2003002998 | A | | 1/2003 | |
| WO | WO-9965977 | A1 | * | 12/1999 | .............. C08J 9/122 |
| WO | WO 2013/149612 | A2 | | 10/2013 | |

OTHER PUBLICATIONS

Machine translation of WO-9965977-A1 obtained from Clarivate Analytics in Mar. 2025 (Year: 2025).*
Machine translation of JP-2001011220-A obtained from Clarivate Analytics in Mar. 2025 (Year: 2025).*
Biodegradable Products Institute, Important PFAS Announcement, Mar. 28, 2018; 2 pages.
Chiang, Sue et al., "Avoiding Hidden Hazards, A Purchaser's Guide to Safer Foodware"; Center for Environmental Health, 2018; 43 pages.
Dreux, Xavier et al.; "Viscoelastic behaviour of cellulose acetate/triacetin blends by rheology in the melt state"; Carbohydrate Polymers, 222, (2019), 8 pages.
Hopman, CH. et al.; AIP Conference Proceedings 1593, 116 (2014); https.//doi.org/10.1063/1.4873746 Published Online: Feb. 17, 2015.
H.R.535—116th Congress (2019-2020): PFAS Action Act of 2019, H.R.535, 116th Cong. (2020), https://www.congress.gov/bill/116th-congress/house-bill/535.
Kirk-Othmer, Encyclopedia of Chemical Technology, 5th Edition, vol. 5, "Cellulose Esters, Inorganic Esters"; Wiley-Interscience, New York (2004), pp. 394-411.
Kirk-Othmer, Encyclopedia of Chemical Technology, 5th Edition, vol. 5, "Cellulose Esters, Organic Esters"; Wiley-Interscience, New York (2004), pp. 412-444.

(Continued)

*Primary Examiner* — Melissa A Rioja
(74) *Attorney, Agent, or Firm* — Javier M. Grajeda; Kenrick L. Vidale

(57) ABSTRACT

A foamable composition comprising at least one cellulose acetate, a plasticizer, a nucleating agent, and either a chemical blowing agent or a physical blowing agent is disclosed. The composition is formed into foamed articles that are biodegradable.

15 Claims, 1 Drawing Sheet

(56) References Cited

OTHER PUBLICATIONS

Kamide, K. and Saito, Masatoshi; "Thermal Analysis of Cellulose Acetate Solids with Total Degrees of Substitution of 0.49, 1.75, 2.46, and 2.92"; Polymer Journal , vol. 17, No. 8; pp. 919-928 ( 1985).
Machulek, Jr., Amilcar et al. Fundamental Mechanistic Studies of the Photo-Fenton Reaction for the Degradation of Organic Pollutants, interchopen.com. 2012; 24 pages.
Notification of Transmittal of the International Search Report and the Written Opinion of the International Searching Authority, or the Declaration date of mailing Apr. 15, 2021 received in International Application No. PCT/US2021/014080.
Phuong, Vu Thanh et al.; "Cellulose Acetate Blends-Effect of Plasticizers on Properties and Biodegradability"; Journal of Renewable Materials; Feb. 2014; pp. 1-7.
Reglero, Ruiz, Jose Antonio, et al. Polymer Engineering Science, 55(9),pp. 2018-2029, 2015.
Wood, Paul M.; "Pathways for producing of Fenton's reagent by wood-rotting fungi"; FEMS Microbiology Reviews 13 (1994) 313-320.
Zepnik, Stefan et al.; "Cellulose Acetate for Thermoplastic Foam Extrusion, Chapter 2"; Intech; 2013; pp. 17-44.
Zepnik, Stefan et al.; "Foam extrusion behavior, morphology, and physical foam properties of organic cellulose ester"; J. Mater. Res, vol. 28, No. 17; 2013; pp. 2394-2400.
Zepnik, Stefan et al.; "Extensional Flow Properties of Externally Plasticized Cellulose Acetate: Influence of Plasticizer Content"; Polymers, 5; 2013; pp. 873-889.
Notification of European Search Report, date of receipt Apr. 10, 2025 received in European Application No. 24221666.1.

* cited by examiner

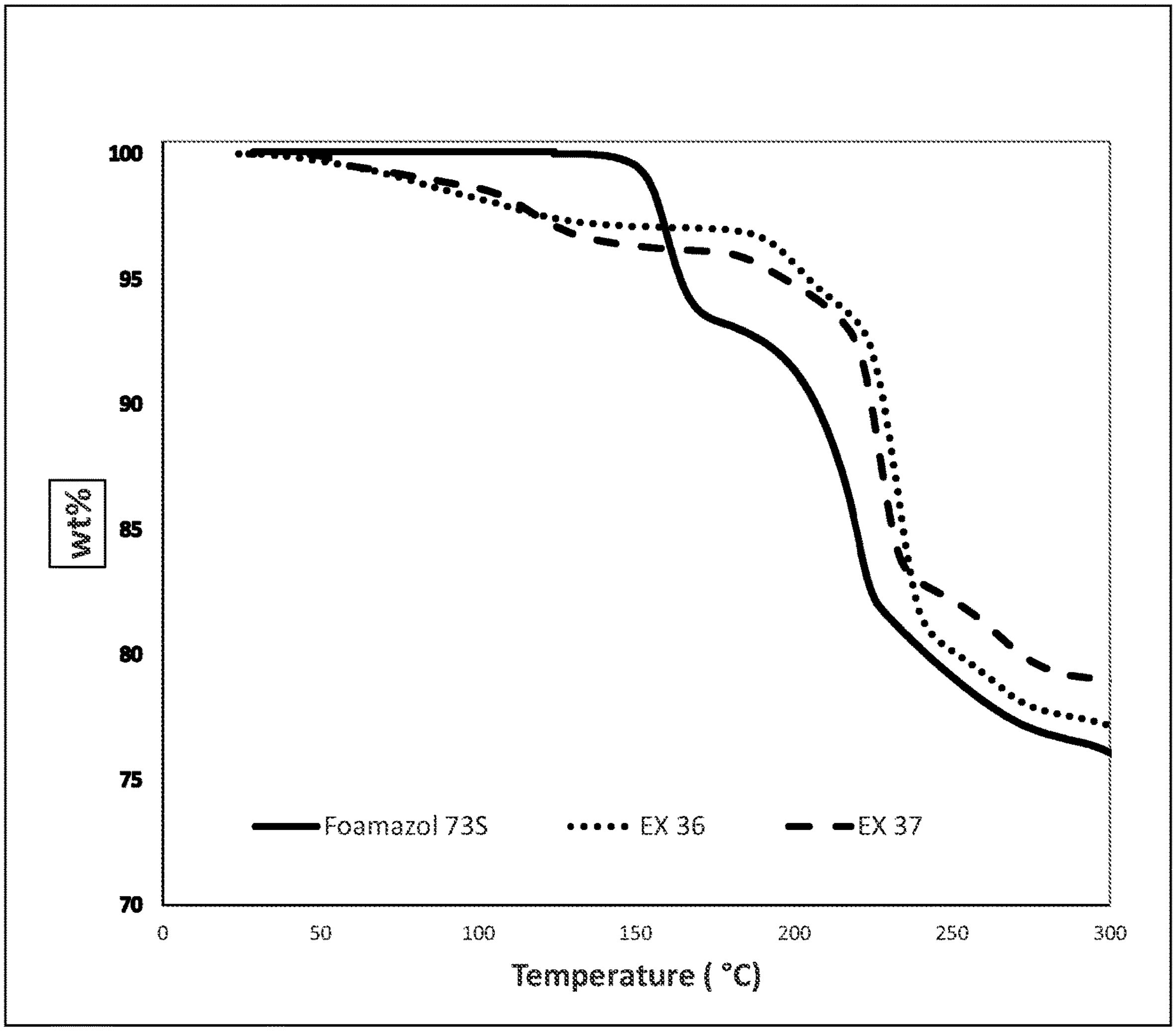
TGA weight loss curves of Ex 36, Ex 37, and Foamazol 73S.

BIODEGRADABLE COMPOSITIONS AND ARTICLES MADE FROM CELLULOSE ACETATE

CROSS-REFERENCE TO RELATED APPLICATION(S)

This application is a national stage filing under 35 USC § 371 of International Application Number PCT/US2021/014080, filed on, Jan. 20, 2021 which claims the benefit of the filing of U.S. Provisional Application No. 62/963,313, filed on Jan. 20, 2020; U.S. Provisional Application No. 62/706,274, filed on Aug. 7, 2020; and U.S. Provisional Application No. 63/051,942, filed on Jul. 15, 2020; the entire disclosures of which are incorporated by reference herein.

BACKGROUND OF THE INVENTION

There is a well-known global issue with waste disposal, particularly of large volume consumer products such as plastics or polymers that are not considered biodegradable within acceptable temporal limits. There is a public desire to incorporate these types of wastes into renewed products through recycling, reuse, or otherwise reducing the amount of waste in circulation or in landfills. This is especially true for single-use plastic articles/materials.

As consumer sentiment regarding the environmental fate of single-use plastics, such as straws, to-go cups, and plastic bags, are becoming a global trend, plastics bans are being considered/enacted around the world in both developed and developing nations. Bans have extended from plastic shopping bags into straws, cutlery, and clamshell packaging, for example, in the US alone. Other countries have taken even more extreme steps, such as the list of ten single-use articles slated to be banned, restricted in use, or mandated to have extended producer responsibilities throughout the EU. As a result, industry leaders, brand owners, and retailers have made ambitious commitments to implement recyclable, reusable or compostable packaging in the corning years. While recyclable materials are desirable in some applications, other applications lend themselves better to materials that are compostable and/or biodegradable, such as when the article is contaminated with food or when there are high levels of leakage into the environment due to inadequate waste management systems.

There is a market need for single-use consumer products that have adequate performance properties for their intended use and that are compostable and/or biodegradable.

It would be beneficial to provide products having such properties and that also have significant content of renewable, recycled, and/or re-used material. One such product is a foam.

SUMMARY OF THE INVENTION

The present application discloses a foamable composition, comprising:

(1) a cellulose acetate having a degree of substitution of acetyl ($DS_{Ac}$) between 2.2 to 2.6;
(2) 5 to 40 wt % of a plasticizer;
(3) 0.1 to 3 wt % of a nucleating agent; and
(4) 0.1 to 3 wt % a chemical blowing composition, comprises:
  (i) 25 to 75 wt. % of a blowing agent, and
  (ii) 25 to 75 wt % of a carrier polymer having a melting point that is no more than 150° C.,
  wherein the proportions of the blowing agent and the carrier polymer are based on the total weight of the chemical blowing composition,
wherein the proportions of the cellulose acetate, plasticizer, nucleating agent and chemical blowing composition are based on the total weight of the foamable composition.

The present application discloses a foamable composition comprising:

(1) a cellulose acetate having a degree of substitution of acetyl ($DS_{Ac}$) between 2.2 to 2.6;
(2) 5 to 40 wt % of a plasticizer;
(3) 0.1 to 3 wt % of a nucleating agent; and
(4) 0.1 to 15 wt % of a physical blowing agent,
wherein the proportions of the cellulose acetate, plasticizer, nucleating agent and physical blowing agent are based on the total weight of the foamable composition.

The present application also discloses additional compositions, articles, and methods.

BRIEF DESCRIPTION OF THE DRAWINGS

FIG. 1 depicts the weight loss curves for Ex 36, Ex 37 and Foamazol 73S.

DETAILED DESCRIPTION OF THE INVENTION

Cellulose Acetate

In embodiments, the cellulose acetate utilized in this invention can be any that is known in the art and that is biodegradable. Cellulose acetate that can be used for the present invention generally comprise repeating units of the structure:

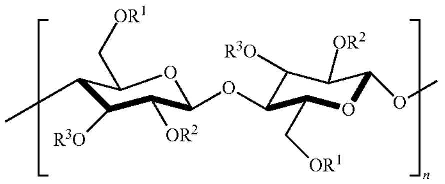

wherein $R^1$, $R^2$, and $R^3$ are selected independently from the group consisting of hydrogen or acetyl. For cellulose esters, the substitution level is usually express in terms of degree of substitution (DS), which is the average number of non-OH substituents per anhydroglucose unit (AGU). Generally, conventional cellulose contains three hydroxyl groups hi each AGU unit that can be substituted; therefore, DS can have a value between zero and three. Native cellulose is a large polysaccharide with a degree of polymerization from 250-5,000 even after pulping and purification, and thus the assumption that the maximum DS is 3.0 is approximately correct. Because DS is a statistical mean value, a value of 1 does not assure that every AGU has a single substitutent. In some cases, there can be unsubstituted anhydroglucose units, some with two and some with three substitutents, and typically the value will be a non-integer. Total DS is defined as the average number of all of substituents per anhydroglucose unit. The degree of substitution per AGU can also refer to a particular substitutent, such as, for example, hydroxyl or acetyl. In embodiments, n is an integer in a range from 25 to 250, or 25 to 200, or 25 to 150, or 25 to 100, or 25 to 75.

In embodiments of the invention, the cellulose acetates have at least 2 anhydroglucose rings and can have between at least 50 and up to 5,000 anhydroglucose rings, or at least 50 and less than 150 anhydroglucose rings. The number of anhydroglucose units per molecule is defined as the degree of polymerization (DP) of the cellulose acetate. In embodiments, cellulose esters can have an inherent viscosity (IV) of about 0.2 to about 3.0 deciliters/gram, or about 0.5 to about 1.8, or about 1 to about 1.5, as measured at a temperature of 25° C. for a 0.25 gram sample in 100 ml of a 60/40 by weight solution of phenol/tetrachloroethane. In embodiments, cellulose acetates useful herein can have a DS/AGU of about 1 to about 2.5, or 1 to less than 2.2, or 1 to less than 1.5, and the substituting ester is acetyl.

Cellulose acetates can be produced by any method known in the art. Examples of processes for producing cellulose esters are taught in Kirk-Othmer, Encyclopedia of Chemical Technology, 5th Edition, Vol. 5, Wiley-Interscience, New York (2004), pp. 394-444. Cellulose, the starting material for producing cellulose acetates, can be obtained in different grades and sources such as from cotton linters, softwood pulp, hardwood pulp, corn fiber and other agricultural sources, and bacterial cellulose, among others.

One method of producing cellulose acetates is esterification of the cellulose by mixing cellulose with the appropriate organic acids, acid anhydrides, and catalysts, Cellulose is then converted to a cellulose triester. Ester hydrolysis is then performed by adding a water-acid mixture to the cellulose triester, which can then be filtered to remove any gel particles or fibers. Water is then added to the mixture to precipitate the cellulose ester. The cellulose ester can then be washed with water to remove reaction by-products followed by dewatering and drying.

The cellulose triesters to be hydrolyzed can have three acetyl substitutents. These cellulose esters can be prepared by a number of methods known to those skilled in the art. For example, cellulose esters can be prepared by heterogeneous acylation of cellulose in a mixture of carboxylic acid and anhydride in the presence of a catalyst such as H2SO4. Cellulose triesters can also be prepared by the homogeneous acylation of cellulose dissolved in an appropriate solvent such as LiCl/DMAc or LiCl/NMP.

Those skilled in the art will understand that the commercial term of cellulose triesters also encompasses cellulose esters that are not completely substituted with acyl groups. For example, cellulose triacetate commercially available from Eastman Chemical Company, Kingsport, TN, U.S.A., typically has a DS from about 2.85 to about 2.99.

After esterification of the cellulose to the triester, part of the acyl substitutents can be removed by hydrolysis or by alcoholysis to give a secondary cellulose ester. As noted previously, depending on the particular method employed, the distribution of the acyl substituents can be random or non-random. Secondary cellulose esters can also be prepared directly with no hydrolysis by using a limiting amount of acylating reagent. This process is particularly useful when the reaction is conducted in a solvent that will dissolve cellulose. All of these methods yield cellulose esters that are useful in this invention.

In one embodiment or in combination with any of the mentioned embodiments, or in combination with any of the mentioned embodiments, the cellulose acetates are cellulose diacetates that have a polystyrene equivalent number average molecular weight (Mn) from about 10,000 to about 100,000 as measured by gel permeation chromatography (GPC) using NMP as solvent and polystyrene equivalent Mn according to ASTM D6474. In embodiments, the cellulose acetate composition comprises cellulose diacetate having a polystyrene equivalent number average molecular weights (Mn) from 10,000 to 90,000; or 10,000 to 80,000; or 10,000 to 70,000; or 10,000 to 60,000; or 10,000 to less than 60,000; or 10,000 to less than 55,000; or 10,000 to 50,000; or 10,000 to less than 50,000; or 10,000 to less than 45,000; or 10,000 to 40,000; or 10,000 to 30,000; or 20,000 to less than 60,000; or 20,000 to less than 55,000; or 20,000 to 50,000; or 20,000 to less than 50,000; or 20,000 to less than 45,000; or 20,000 to 40,000; or 20,000 to 35,000; or 20,000 to 30,000; or 30,000 to less than 60,000; or 30,000 to less than 55,000; or 30,000 to 50,000; or 30,000 to less than 50,000; or 30,000 to less than 45,000; or 30,000 to 40,000; or 30,000 to 35,000; as measured by gel permeation chromatography (GPC) using NMP as solvent and according to ASTM D6474.

The most common commercial secondary cellulose esters are prepared by initial acid catalyzed heterogeneous acylation of cellulose to form the cellulose triester. After a homogeneous solution in the corresponding carboxylic acid of the cellulose triester is obtained, the cellulose triester is then subjected to hydrolysis until the desired degree of substitution is obtained. After isolation, a random secondary cellulose ester is obtained. That is, the relative degree of substitution (RDS) at each hydroxyl is roughly equal.

The cellulose acetates useful in the present invention can be prepared using techniques known in the art, and can be chosen from various types of cellulose esters, such as for example the cellulose esters that can be obtained from Eastman Chemical Company, Kingsport, TN, U.S.A., e.g., Eastman™ Cellulose Acetate CA 398-30 and Eastman™ Cellulose Acetate CA 398-10.

In embodiments of the invention, the cellulose acetate can be prepared by converting cellulose to a cellulose ester with reactants that are obtained from recycled materials, e.g., a recycled plastic content syngas source. In embodiments, such reactants can be cellulose reactants that include organic acids and/or acid anhydrides used in the esterification or acylation reactions of the cellulose, e.g., as discussed herein.

In one embodiment or in combination with any of the mentioned embodiments, or in combination with any of the mentioned embodiments, of the invention, a cellulose acetate composition comprising at least one recycle cellulose acetate is provided, wherein the cellulose acetate has at least one substituent on an anhydroglucose unit (AU) derived from recycled content material, e.g., recycled plastic content syngas.

In an aspect, the biodegradable cellulose acetates can be formulated into cellulose acetate compositions with a plasticizer and at least one of a filler, additive, biopolymer, stabilizer, and/or odor modifier. Examples of additives include waxes, compatibilizers, biodegradation promoters, dyes, pigments, colorants, luster control agents, lubricants, anti-oxidants, viscosity modifiers, antifungal agents, anti-fogging agents, heat stabilizers, impact modifiers, antibacterial agents, softening agents, mold release agents, and combinations thereof. It should be noted that the same type of compounds or materials can be identified for or included in multiple categories of components in the cellulose acetate compositions. For example, polyethylene glycol (PEG) could function as a plasticizer or as an additive that does not function as a plasticizer, such as a hydrophilic polymer or biodegradation promotor, e.g., where a lower molecular weight PEG has a plasticizing effect and a higher molecular weight PEG functions as a hydrophilic polymer but without plasticizing effect.

In embodiments, the cellulose acetate composition comprises biodegradable cellulose acetate (BCA) and at least one plasticizer. The plasticizer reduces the melt temperature, the Tg, and/or the melt viscosity of the cellulose acetate. In embodiments, the plasticizer is a food-compliant plasticizer, By food-compliant is meant compliant with applicable food additive and/or food contact regulations where the plasticizer is cleared for use or recognized as safe by at least one (national or regional) food safety regulatory agency (or organization), for example listed in the 21 CFR Food Additive Regulations or otherwise Generally Recognized as Safe (GRAS) by the US FDA. In embodiments, the food-compliant plasticizer is triacetin. In embodiments, examples of food-compliant plasticizers that could be considered can include triacetin, triethyl citrate, polyethylene glycol, Benzoflex, propylene glycol, polysorbatemsucrose octaacetate, acetylated triethyl citrate, acetyl tributyl citrate, Admex, tripropionin, Scandiflex, poloxamer copolymers, polyethylene glycol succinate, diisobutyl adipate, polyvinyl pyrollidone, and glycol tribenzoate.

In embodiments, the plasticizer can be present in an amount sufficient to permit the cellulose acetate composition to be melt processed (or thermally formed) into useful articles, e.g., single use plastic articles, in conventional melt processing equipment. In embodiments, the plasticizer is present in an amount from 1 to 40 wt % for most thermoplastics processing; or 15 to 25 wt %, or 13-17 wt % for profile extrusion; or 19-22 wt % for sheet extrusion; or 23-27 wt % for injection molding, based on the weight of the cellulose acetate composition. In embodiments, profile extrusion, sheet extrusion, thermoforming, and injection molding can be accomplished with plasticizer levels in the 13-30, or 13-25, or 15-30, or 15-25 wt % range, based on the weight of the cellulose acetate composition.

In embodiments, the plasticizer is a biodegradable plasticizer. Some examples of biodegradable plasticizers include triacetin, triethyl citrate, acetyl triethyl citrate, polyethylene glycol, the benzoate containing plasticizers such as the BenzoFlex™ plasticizer series, poly (alkyl succinates) such as poly (butyl succinate), polyethersulfones, adipate based plasticizers, soybean oil epoxides such as the Paraplex™ plasticizer series, sucrose based plasticizers, dibutyl sebacate, tributyrin, sucrose acetate isobutyrate, the Resolflex™ series of plasticizers, triphenyl phosphate, glycolates, polyethylene glycol, 2,2,4-trimethylpentane-1,3-diyl bis(2-methylpropanoate), and polycaprolactones.

In embodiments, the cellulose acetate composition comprises a biodegradable CA component that comprises at least one BCA and a biodegradable polymer component that comprises at least one other biodegradable polymer (other than the BOA). In embodiments, the other biodegradable polymer can be chosen from polyhydroxyalkanoates (PHAs and PHBs), polylactic acid (PLA), polycaprolactone polymers (PCL), polybutylene adipate terephthalate (PBAT), polyethylene succinate (PES), polyvinyl acetates (PVAs), polybutylene succinate (PBS) and copolymers (such as polybutylene succinate-co-adipate (PBSA)), cellulose esters, cellulose ethers, starch, proteins, derivatives thereof, and combinations thereof. In embodiments, the cellulose acetate composition comprises two or more biodegradable polymers. In embodiments, the cellulose acetate composition contains a biodegradable polymer (other than the BOA) in an amount from 0.1 to less than 50 wt %, or 1 to 40 wt %, or 1 to 30 wt %, or 1 to 25 wt %, or 1 to 20 wt %, based on the cellulose acetate composition. In embodiments, the cellulose acetate composition contains a biodegradable polymer (other than the BOA) in an amount from 0.1 to less than 50 wt %, or 1 to 40 wt %, or 1 to 30 wt %, or 1 to 25 wt %, or 1 to 20 wt %, based on the total amount of BOA and biodegradable polymer. In embodiments, the at least one biodegradable polymer comprises a PHA having a weight average molecular weight (Mw) in a range from 10,000 to 1,000,000, or 50,000 to 1,000,000, or 100,000 to 1,000,000, or 250,000 to 1,000,000, or 500.000 to 1,000,000, or 600,000 to 1,000,000, or 600,000 to 900,000, or 700,000 to 800,000, or 10,000 to 500,000, or 10,000 to 250,000, or 10,000 to 100,000, or 10,000 to 50,000, measured using gel permeation chromatography (GPO) with a refractive index detector and polystyrene standards employing a solvent of methylene chloride. In embodiments, the PHA can include a polyhydroxybutyrate-co-hydroxyhexanoate.

In embodiments, the cellulose acetate composition comprises a biodegradable CA component that comprises at least one BOA and a biodegradable polymer component that comprises at least one other biodegradable polymer (other than the BOA). In embodiments, the other biodegradable polymer can be chosen from polyhydroxyalkanoates (PHAs and PHBs), polylactic acid (PLA), polycaprolactone polymers (PCL), polybutylene adipate terephthalate (PBAT), polyethylene succinate (PES), polyvinyl acetates (PVAs), polybutylene succinate (PBS), cellulose esters, cellulose ethers, starch, proteins, derivatives thereof, and combinations thereof. In embodiments, the cellulose acetate composition comprises two or more biodegradable polymers. In embodiments, the cellulose acetate composition contains a biodegradable polymer (other than the BOA) in an amount from 0.1 to less than 50 wt %, or 1 to 40 wt %, or 1 to 30 wt %, or 1 to 25 wt %, or 1 to 20 wt %, based on the cellulose acetate composition. In embodiments, the cellulose acetate composition contains a biodegradable polymer (other than the BOA) in an amount from 0.1 to less than 50 wt %, or 1 to 40 wt %, or 1 to 30 wt %, or 1 to 25 wt %, or 1 to 20 wt %, based on the total amount of BOA and biodegradable polymer. In embodiments, the at least one biodegradable polymer comprises a PHA having a weight average molecular weight (Mw) in a range from 600,000 to 1,000,000, or 600,000 to 900,000, or 700,000 to 800,000, measured using gel permeation chromatography (GPO) with a refractive index detector and polystyrene standards employing a solvent of methylene chloride. In embodiments, the PHA can include polyhydroxybutyrate-co-hydroxyhexanoate.

In certain embodiments, the cellulose acetate composition comprises at least one stabilizer. Although it is desirable for the cellulose acetate composition to be composable and/or biodegradable, a certain amount of stabilizer may be added to provide a selected shelf life or stability, e.g., towards light exposure, oxidative stability, or hydrolytic stability. In various embodiments, stabilizers can include: UV absorbers, antioxidants (ascorbic acid, BHT, BHA, etc.), other acid and radical scavengers, epoxidized oils, e.g., epoxidized soybean oil, or combinations thereof.

Antioxidants can be classified into several classes, including primary antioxidant, and secondary antioxidant. Primary antioxidants a generally known to function essentially as free radical terminators (scavengers). Secondary antioxidants are generally known to decompose hydroperoxides (ROOH) into nonreactive products before they decompose into alkoxy and hydroxy radicals. Secondary antioxidants are often used in combination with free radical scavengers (primary antioxidants) to achieve a synergistic inhibition effect and secondary AOs are used to extend the life of phenolic type primary AOs.

"Primary antioxidants" are antioxidants that act by reacting with peroxide radicals via a hydrogen transfer to quench the radicals. Primary antioxidants generally contain reactive hydroxy or amino groups such as in hindered phenols and secondary aromatic amines. Examples of primary antioxidants include BHT, Irganox™ 1010, 1076, 1726, 245, 1098, 259, and 1425; Ethanox™ 310, 376, 314, and 330; Evernox™ 10, 76, 1335, 1330, 3114, MD 1024, 1098, 1726, 120. 2246, and 565; Anox™ 20, 29, 330, 70, IC-14, and 1315; Lowinox™ 520, 1790, 22IB46, 22M46, 44B25, AH25, GP45, CA22, CPL, H098, TBM-6, and WSP; Naugard™ 431, PS48, SP, and 445; Songnox™ 1010, 1024, 1035, 1076 CP, 1135 LQ, 1290 PW, 1330FF, 1330PW, 2590 PW, and 3114 FF; and ADK Stab AO-20, AO-30, AO-40, AO-50, AO-60, AO-80, and AO-330.

"Secondary antioxidants" are often called hydroperoxide decomposers. They act by reacting with hydroperoxides to decompose them into nonreactive and thermally stable products that are not radicals. They are often used in conjunction with primary antioxidants. Examples of secondary antioxidants include the organophosphorous (e.g., phosphites, phosphonites) and organosulfur classes of compounds. The phosphorous and sulfur atoms of these compounds react with peroxides to convert the peroxides into alcohols. Examples of secondary antioxidants include Ultranox 626, Ethanox™ 368, 326, and 327; Doverphos™ LPG11, LPG12, DP S-680, 4, 10, S480, S-9228, S 9228T; Evernox™ 168 and 626; Irgafos™ 126 and 168; Weston™ DPDP, DPP, EHDP, PODP, TDP, TLP, and TPP; Mark™ CH 302, CH 55, TNPP, CH66, CH 300, CH 301, CH 302, CH 304, and CH 305; ADK Stab 2112, HP-10, PEP-8, PEP-36, 1178, 135A, 1500, 3010, C, and TPP; Weston 439, DHOP, OPDP, DPP, DPTOP, EHDP, PDOP, PNPG, PTP, PTP, TOP, TLP, TPP, 398, 399, 430, 705, 705T, TLTTP, and TNPP; Alkanox 240, 626, 626A, 627AV, 618F, and 619F; and Songnox™ 1680 FF, 1680 PW, and 6280 FF.

In embodiments, the cellulose acetate composition comprises at least one stabilizer, wherein the stabilizer comprises one or more secondary antioxidants. In embodiments, the stabilizer comprises a first stabilizer component chosen from one or more secondary antioxidants and a second stabilizer component chosen from one or more primary antioxidants, citric acid or a combination thereof.

In embodiments, the stabilizer comprises one or more secondary antioxidants in an amount in the range of from 0.01 to 0.8, or 0.01 to 0.7, or 0.01 to 0.5, or 0.01 to 0.4, or 0.01 to 0.3, or 0.01 to 0.25, or 0.01 to 0.2, or 0.05 to 0.8, or 0.05 to 0.7, or 0.05 to 0.5, or 0.05 to 0.4, or 0.05 to 0.3, or 0.05 to 0.25, or 0.05 to 0.2, or 0.08 to 0.8, or 0.08 to 0.7, or 0.08 to 0.5, or 0.08 to 0.4, or 0.08 to 0.3, or 0.08 to 0.25, or 0.08 to 0.2, in weight percent of the total amount of secondary antioxidants based on the total weight of the composition. In one class of this embodiment, the stabilizer comprises a secondary antioxidant that is a phosphite compound. In one class of this embodiment, the stabilizer comprises a secondary antioxidant that is a phosphite compound and another secondary antioxidant that is DLTDP.

In one subclass of this class, the stabilizer further comprises a second stabilizer component that comprises one or more primary antioxidants in an amount in the range of from 0.05 to 0.7, or 0.05 to 0.6, or 0.05 to 0.5, or 0.05 to 0.4, or 0.05 to 0.3, or 0.1 to 0.6, or 0.1 to 0.5, or 0.1 to 0.4, or 0.1 to 0.3, in weight percent of the total amount of primary antioxidants based on the total weight of the composition. In one subclass of this class, the stabilizer further comprises a second stabilizer component that comprises citric acid in an amount in the range of from 0.05 to 0.2, or 0.05 to 0.15, or 0.05 to 0.1 in weight percent of the total amount of citric acid based on the total weight of the composition. In one subclass of this class, the stabilizer further comprises a second stabilizer component that comprises one or more primary antioxidants and citric acid in the amounts discussed herein. In one subclass of this class, the stabilizer comprises less than 0.1 wt % or no primary antioxidants, based on the total weight of the composition. In one subclass of this class, the stabilizer comprises less than 0.05 wt % or no primary antioxidants, based on the total weight of the composition.

In embodiments, the cellulose acetate composition comprises at least one filler. In embodiments, the filler is of a type and present in an amount to enhance biodegradability and/or compostability. In embodiments, the cellulose acetate composition comprises at least one filler chosen from: carbohydrates (sugars and salts), cellulosic and organic fillers (wood flour, wood fibers, hemp, carbon, coal particles, graphite, and starches), mineral and inorganic fillers (calcium carbonate, talc, silica, titanium dioxide, glass fibers, glass spheres, boronitride, aluminum trihydrate, magnesium hydroxide, calcium hydroxide, alumina, and clays), food wastes or byproduct (eggshells, distillers grain, and coffee grounds), desiccants (e.g. calcium sulfate, magnesium sulfate, magnesium oxide, calcium oxide), alkaline fillers (e.g., $Na_2CO_3$, $MgCO_3$), or combinations (e.g., mixtures) of these fillers. In embodiments, the cellulose acetate compositions can include at least one filler that also functions as a colorant additive. In embodiments, the colorant additive filler can be chosen from: carbon, graphite, titanium dioxide, opacifiers, dyes, pigments, toners and combinations thereof. In embodiments, the cellulose acetate compositions can include at least one filler that also functions as a stabilizer or flame retardant.

In embodiments, the cellulose acetate composition comprises at least one plasticizer (as described herein) in an amount from 1 to 40 wt %, or 5 to 40 wt %, or 10 to 40 wt %, or 13 to 40 wt %, or 15 to 40 wt %, or greater than 15 to 40 wt %, or 17 to 40 wt %, or 20 to 40 wt %, or 25 to 40 wt %, or 5 to 35 wt %, or 10 to 35 wt %, or 13 to 35 wt %, or 15 to 35 wt %, or greater than 15 to 35 wt %, or 17 to 35 wt %, or 20 to 35 wt %, or 5 to 30 wt %, or 10 to 30 wt %, or 13 to 30 wt %, or 15 to 30 wt %, or greater than 15 to 30 wt %, or 17 to 30 wt %, or 5 to 25 wt %, or 10 to 25 wt %, or 13 to 25 wt %, or 15 to 25 wt %, or greater than 15 to 25 wt %, or 17 to 25 wt %, or 5 to 20 wt %, or 10 to 20 wt %, or 13 to 20 wt %, or 15 to 20 wt %, or greater than 15 to 20 wt %, or 17 to 20 wt %, or 5 to 17 wt %, or 10 to 17 wt %, or 13 to 17 wt %, or 15 to 17 wt %, or greater than 15 to 17 wt %, or 5 to less than 17 wt %, or 10 to less than 17 wt %, or 13 to less than 17 wt %, or 15 to less than 17 wt %, all based on the total weight of the cellulose acetate composition. In embodiments, the cellulose acetate composition further comprises at least one filler (as described herein) in an amount from 1 to 60 wt %, or 5 to 55 wt %, or 5 to 50 wt %, or 5 to 45 wt %, or 5 to 40 wt %, or 5 to 35 wt %, or 5 to 30 wt %, or 5 to 25 wt %, or 10 to 55 wt %, or 10 to 50 wt %, or 10 to 45 wt %, or 10 to 40 wt %, or 10 to 35 wt %, or 10 to 30 wt %, or 10 to 25 wt %, or 15 to 55 wt %, or 15 to 50 wt %, or 15 to 45 wt %, or 15 to 40 wt %, or 15 to 35 wt %, or 15 to 30 wt %, or 15 to 25 wt %, or 20 to 55 wt %, or 20 to 50 wt %, or 20 to 45 wt %, or 20 to 40 wt %, or 20 to 35 wt %, or 20 to 30 wt %, all based on the total weight of the cellulose acetate composition. In embodiments, the at least one plasticizer includes or is a food-compliant plasticizer. In an embodiment, the food-compliant plasticizer includes or is triacetin. In embodiments, the filler includes or is calcium carbonate.

In embodiments, depending on the application, e.g., single use food contact applications, the cellulose acetate composition can include at least one odor modifying additive. In embodiments, depending on the application and components used in the cellulose acetate composition, suitable odor modifying additives can be chosen from: vanillin, Pennyroyal M-1178, almond, cinnamyl, spices, spice extracts, volatile organic compounds or small molecules, and Plastidor. In one embodiment, the odor modifying additive can be vanillin. In embodiments, the cellulose acetate composition can include an odor modifying additive in an amount from 0.01 to 1 wt %, or 0.1 to 0.5 wt %, or 0.1 to 0.25 wt %, or 0.1 to 0.2 wt %, based on the total weight of the composition. Mechanisms for the odor modifying additives can include masking, capturing, complementing or combinations of these.

As discussed above, the cellulose acetate composition can include other additives. In embodiments, the cellulose acetate composition can include at least one compatibilizer. In embodiments, the compatibilizer can be either a non-reactive compatibilizer or a reactive compatibilizer. The compatibilizer can enhance the ability of the cellulose acetate or another component to reach a desired small particle size to improve the dispersion of the chosen component in the composition. In such embodiments, depending on the desired formulation, the biodegradable cellulose acetate can either be in the continuous or discontinuous phase of the dispersion. In embodiments, the compatibilizers used can improve mechanical and/or physical properties of the compositions by modifying the interfacial interaction/bonding between the biodegradable cellulose acetate and another component, e.g., other biodegradable polymer.

In embodiments, the cellulose acetate composition comprises a compatibilizer in an amount from about 1 to about 40 wt %, or about 1 to about 30 wt %, or about 1 to about 20 wt %, or about 1 to about 10 wt %, or about 5 to about 20 wt %, or about 5 to about 10 wt %, or about 10 to about 30 wt %, or about 10 to about 20 wt %, based on the weight of the cellulose acetate composition.

In embodiments, if desired, the cellulose acetate composition can include biodegradation and/or decomposition agents, e.g., hydrolysis assistant or any intentional degradation promoter additives can be added to or contained in the cellulose acetate composition, added either during manufacture of the biodegradable cellulose acetate (BCA) or subsequent to its manufacture and melt or solvent blended together with the BCA to make the cellulose acetate composition. In embodiments, additives can promote hydrolysis by releasing acidic or basic residues, and/or accelerate photo (UV) or oxidative degradation and/or promote the growth of selective microbial colony to aid the disintegration and biodegradation in compost and soil medium. In addition to promoting the degradation, these additives can have an additional function such as improving the processability of the article or improving desired mechanical properties.

One set of examples of possible decomposition agents include inorganic carbonate, synthetic carbonate, nepheline syenite, talc, magnesium hydroxide, aluminum hydroxide, diatomaceous earth, natural or synthetic silica, calcined clay, and the like. In embodiments, it may be desirable that these additives are dispersed well in the cellulose acetate composition matrix. The additives can be used singly, or in a combination of two or more.

Another set of examples of possible decomposition agents are aromatic ketones used as an oxidative decomposition agent, including benzophenone, anthraquinone, anthrone, acetylbenzophenone, 4-octylbenzophenone, and the like. These aromatic ketones may be used singly, or in a combination of two or more.

Other examples include transition metal compounds used as oxidative decomposition agents, such as salts of cobalt or magnesium, e.g., aliphatic carboxylic acid (C12 to C20) salts of cobalt or magnesium, or cobalt stearate, cobalt oleate, magnesium stearate, and magnesium oleate; or anatase-form titanium dioxide, or titanium dioxide may be used. Mixed phase titanium dioxide particles may be used in which both rutile and anatase crystalline structures are present in the same particle. The particles of photoactive agent can have a relatively high surface area, for example from about 10 to about 300 sq. m/g, or from 20 to 200 sq. m/g, as measured by the BET surface area method. The photoactive agent can be added to the plasticizer if desired. These transition metal compounds can be used singly, or in a combination of two or more.

Examples of rare earth compounds that can used as oxidative decomposition agents include rare earths belonging to periodic table Group 3A, and oxides thereof. Specific examples thereof include cerium (Ce), yttrium (Y), neodymium (Nd), rare earth oxides, hydroxides, rare earth sulfates, rare earth nitrates, rare earth acetates, rare earth chlorides, rare earth carboxylates, and the like. More specific examples thereof include cerium oxide, ceric sulfate, ceric ammonium Sulfate, ceric ammonium nitrate, cerium acetate, lanthanum nitrate, cerium chloride, cerium nitrate, cerium hydroxide, cerium octylate, lanthanum oxide, yttrium oxide, Scandium oxide, and the like. These rare earth compounds may be used singly, or in a combination of two or more.

In one embodiment, the BOA composition includes an additive with pro-degradant functionality to enhance biodegradability that comprises a transition metal salt or chemical catalyst, containing transition metals such as cobalt, manganese and iron. The transition metal salt can comprise of tartrate, sterate, oleate, citrate and chloride. The additive can further comprise of a free radical scavenging system and one or more inorganic or organic fillers such as chalk, talc, silica, wollastonite, starch, cotton, reclaimed cardboard and plant matter. The additive can also comprise an enzyme, a bacterial culture, a swelling agent, CMC, sugar or other energy sources. The additive can also comprise hydroxylamine esters and thio compounds.

In certain embodiments, other possible biodegradation and/or decomposition agents can include swelling agents and disintegrates, Swelling agents can be hydrophilic materials that increase in volume after absorbing water and exert pressure on the surrounding matrix. Disintegrants can be additives that promote the breakup of a matrix into smaller fragments in an aqueous environment. Examples include minerals and polymers, including crosslinked or modified polymers and swellable hydrogels. In embodiments, the BCA composition may include water-swellable minerals or clays and their salts, such as laponite and bentonite; hydrophilic polymers, such as poly(acrylic acid) and salts, poly (acrylamide), polyethylene glycol) and polyvinyl alcohol); polysaccharides and gums, such as starch, alginate, pectin, chitosan, *psyllium*, xanthan gum; guar gum, locust bean gum; and modified polymers, such as crosslinked PVP, sodium starch glycolate, carboxymethyl cellulose, gelatinized starch, croscarmellose sodium; or combinations of these additives.

In embodiments, the BOA composition can comprise a basic additive that can increase decomposition or degradation of the composition or article made from (or comprising) the composition. Examples of basic additives that may be used as oxidative decomposition agents include alkaline earth metal oxides, alkaline earth metal hydroxides, alkaline earth metal carbonates, alkali metal carbonates, alkali metal bicarbonates, ZnO and basic $Al_2O_3$. In embodiments, at least one basic additive can be MgO, $Mg(OH)_2$, $MgCO_3$, CaO, $Ca(OH)_2$, $CaCO_3$, $NaHCO_3$, $Na_2CO_3$, $K_2CO_3$, ZnO $KHCO_3$ or basic $Al_2O_3$. In one aspect, alkaline earth metal oxides, ZnO and basic $Al_2O_3$ can be used as a basic additive. In embodiments, combinations of different basic additives, or basic additives with other additives, can be used. In embodiments, the basic additive has a pH in the range from greater than 7.0 to 10.0, or 7.1 to 9.5, or 7.1 to 9.0, or 7.1 to 8.5, or 7.1 to 8.0, measured in a 1 wt % mixture/solution of water.

Examples of organic acid additives that can be used as oxidative decomposition agents include acetic acid, propionic acid, butyric acid, valeric acid, citric acid, tartaric acid, oxalic acid, malic acid, benzoic acid, formate, acetate, propionate, butyrate, valerate citrate, tartarate, oxalate, malate, maleic acid, maleate, phthalic acid, phthalate, benzoate, and combinations thereof.

Examples of other hydrophilic polymers or biodegradation promoters may include glycols, polyglycols, polyethers, and polyalcohols or other biodegradable polymers such as poly(glycolic acid), polylactic acid), polyethylene glycol, polypropylene glycol, polydioxanes, polyoxalates, poly(α-esters), polycarbonates, polyanhydrides, polyacetals, polycaprolactones, poly(orthoesters), polyamino acids, aliphatic polyesters such as poly(butylene)succinate, poly(ethylene) succinate, starch, regenerated cellulose, or aliphatic-aromatic polyesters such as PBAT.

In embodiments, examples of colorants can include carbon black, iron oxides such as red or blue iron oxides, titanium dioxide, silicon dioxide, cadmium red, calcium carbonate, kaolin clay, aluminum hydroxide, barium sulfate, zinc oxide, aluminum oxide; and organic pigments such as azo and diazo and triazo pigments, condensed azo, azo lakes, naphthol pigments, anthrapyrimidine, benzimidazolone, carbazole, diketopyrrolopyrrole, flavanthrone, indigoid pigments, isoindolinone, isoindoline, isoviolanthrone, metal complex pigments, oxazine, perylene, perinone, pyranthrone, pyrazoloquinazolone, quinophthalone, triarylcarbonium pigments, triphendioxazine, xanthene, thioindigo, indanthrone, isoindanthrone, anthanthrone, anthraquinone, isodibenzanthrone, triphendioxazine, quinacridone and phthalocyanine series, especially copper phthalocyanme and its nuclear halogenated derivatives, and also lakes of acid, basic and mordant dyes, and isoindolinone pigments, as well as plant and vegetable dyes, and any other available colorant or dye.

In embodiments, luster control agents for adjusting the glossiness and fillers can include silica, talc, clay, barium sulfate, barium carbonate, calcium sulfate, calcium carbonate, magnesium carbonate, and the like.

Suitable flame retardants can include silica, metal oxides, phosphates, catechol phosphates, resorcinol phosphates, borates, inorganic hydrates, and aromatic polyhalides.

Antifungal and/or antibacterial agents include polyene antifungals (e.g., natamycin, rimocidin, filipin, nystatin, amphotericin B, candicin, and hamycin), imidazole antifungals such as miconazole (available as MICATIN® from WellSpring Pharmaceutical Corporation), ketoconazole (commercially available as NIZORAL® from McNeil consumer Healthcare), clotrimazole (commercially available as LOTRAMIN® and LOTRAMIN AF® available from Merck and CANESTEN® available from Bayer), econazole, omoconazole, bifonazole, butoconazole, fenticonazole, isoconazole, oxiconazole, sertaconazole (commercially available as ERTACZO® from OrthoDematologics), sulconazole, and tioconazole; triazole antifungals such as fluconazole, itraconazole, isavuconazole, ravuconazole, posaconazole, voriconazole, terconazole, and albaconazole), thiazole antifungals (e.g., abafungin), allylamine antifungals (e.g., terbinafine (commercially available as LAMISIL® from Novartis Consumer Health, Inc.), naftifine (commercially available as NAFTIN® available from Merz Pharmaceuticals), and butenafine (commercially available as LOTRAMIN ULTRA® from Merck), echinocandin antifungals (e.g., anidulafungin, caspofungin, and micafungin), polygodial, benzoic acid, ciclopirox, tolnaftate (e.g., commercially available as TINACTIN® from MDS Consumer Care, Inc.), undecylenic acid, flucytosine, 5-fluorocytosine, griseofulvin, haloprogin, caprylic acid, and any combination thereof.

Viscosity modifiers having the purpose of modifying the melt flow index or viscosity of the biodegradable cellulose acetate composition that can be used include polyethylene glycols and polypropylene glycols, and glycerin.

In embodiments, other components that can be included in the BOA composition may function as release agents or lubricants (e.g. fatty acids, ethylene glycol distearate), anti-block or slip agents (e.g. fatty acid esters, metal stearate salts (for example, zinc stearate), and waxes), antifogging agents (e.g. surfactants), thermal stabilizers (e.g. epoxy stabilizers, derivatives of epoxidized soybean oil (ESBO), linseed oil, and sunflower oil), anti-static agents, foaming agents, biocides, impact modifiers, or reinforcing fibers. More than one component may be present in the BOA composition. It should be noted that an additional component may serve more than one function in the BOA composition. The different (or specific) functionality of any particular additive (or component) to the BOA composition can be dependent on its physical properties (e.g., molecular weight, solubility, melt temperature, Tg, etc.) and/or the amount of such additive/component in the overall composition. For example, polyethylene glycol can function as a plasticizer at one molecular weight or as a hydrophilic agent (with little or no plasticizing effect) at another molecular weight.

In embodiments, fragrances can be added if desired. Examples of fragrances can include spices, spice extracts, herb extracts, essential oils, smelling salts, volatile organic compounds, volatile small molecules, methyl formate, methyl acetate, methyl butyrate, ethyl acetate, ethyl butyrate, isoamyl acetate, pentyl butyrate, pentyl pentanoate, octyl acetate, myrcene, geraniol, neral, citral, citronellal, citronellol, linalool, nerolidol, limonene, camphor, terpineol, alpha-ionone, thujone, benzaldehyde, eugenol, isoeugenol, cinnamaldehyde, ethyl maltol, vanilla, vanillin, cinnamyl alcohol, anisole, anethole, estragole, thymol, furaneol, methanol, rosemary, lavender, citrus, freesia, apricot blossoms, greens, peach, jasmine, rosewood, pine, thyme, oakmoss, musk, vetiver, myrrh, blackcurrant, bergamot, grapefruit, acacia, passiflora, sandalwood, tonka bean, mandarin, neroli, violet leaves, gardenia, red fruits, ylang-ylang, acacia farnesiana, mimosa, tonka bean, woods, ambergris, daffodil, hyacinth, narcissus, black currant bud, iris, raspberry, lily of the valley, sandalwood, vetiver, cedarwood, neroli, strawberry, carnation, oregano, honey, civet, heliotrope, caramel, coumarin, patchouli, dewberry, helonial, coriander, pimento berry, labdanum, cassie, aldehydes, orchid, amber, orris, tuberose, palmarosa, cinnamon, nutmeg, moss, styrax, pineapple, foxglove, tulip, wisteria, clematis, ambergris, gums, resins, civet, plum, castoreum, civet, myrrh, geranium, rose violet, jonquil, spicy carnation, galbanum, petitgrain, iris, honeysuckle, pepper, raspberry, benzoin, mango, coconut, hesperides, castorem, osmanthus, mousse de chene, nectarine, mint, anise, cinnamon, orris, apricot, plumeria, marigold, rose otto, narcissus, tole balsam, frankincense, amber, orange blossom, bourbon vetiver, opopanax, white musk, papaya, sugar candy, jackfruit, honeydew, lotus blossom, muguet, mulberry, absinthe, ginger, juniper berries, spicebush, peony, violet, lemon, lime, hibiscus, white rum, basil, lavender, balsamics, fo-ti-Heng, osmanthus, karo karunde, white orchid, calla lilies, white rose, rhubrum lily, tagetes, ambergris, ivy, grass, seringa, spearmint, clary sage, cottonwood, grapes, brimbelle, lotus, cyclamen, orchid, glycine, tiare flower, ginger lily, green osmanthus, passion flower, blue rose, bay rum, cassie, African tagetes, Anatolian rose, Auvergne narcissus, British broom, British broom chocolate, Bulgarian rose, Chinese patchouli, Chinese gardenia. Calabrian mandarin, Comoros Island tuberose, Ceylonese cardamom, Caribbean passion fruit, Damascena rose, Georgia peach, white Madonna lily, Egyptian jasmine, Egyptian marigold, Ethiopian civet, Farnesian cassie, Florentine iris, French jasmine, French jonquil, French hyacinth, Guinea oranges, Guyana wacapua, Grasse petitgrain, Grasse rose. Grasse tuberose. Haitian vetiver, Hawaiian pineapple, Israeli basil, Indian sandalwood, Indian Ocean vanilla, Italian bergamot, Italian iris, Jamaican pepper, May rose, Madagascar ylang-ylang, Madagascar vanilla, Moroccan jasmine, Moroccan rose, Moroccan oakmoss, Moroccan orange blossom, Mysore sandalwood, Oriental rose, Russian leather, Russian coriander, Sicilian mandarin, South African marigold, South American tonka bean, Singapore patchouli, Spanish orange blossom, Sicilian lime, Reunion Island vetiver, Turkish rose, Thai benzoin, Tunisian orange blossom, Yugoslavian oakmoss, Virginian cedarwood, Utah yarrow, West Indian rosewood, and the like, and any combination thereof.

In embodiments, the cellulose acetate compositions can be extrudable, moldable, castable, thermoformable, or can be 3D printed. In embodiments, the cellulose acetate composition is melt-processable and can be formed into useful molded articles, e.g., single use food contact articles, that are biodegradable and/or compostable (i.e., either pass industrial or home compostability testslcriterial as discussed herein). In embodiments, the articles are non-persistent. By environmentally “non-persistent” is meant that when biodegradable cellulose acetate reaches an advanced level of disintegration, it becomes amenable to total consumption by the natural microbial population. The degradation of biodegradable cellulose acetate ultimately leads its conversion to carbon dioxide, water and biomass. In embodiments, articles comprising the cellulose acetate compositions (discussed herein) are provided that have a maximum thickness up to 150 mils, or 140 mils, or 130 mils, or 120 mils, or 110 mils, or 100 mils, or 90 mils, or 80 mils, or 70 mils, or 60 mils, or 50 mils, or 40 mils, or 30 mils, or 25 mils, or 20 mils, or 15 mils, or 10 mils, and are biodegradable and compostable. In embodiments, articles comprising the cellulose acetate compositions (discussed herein) are provided that have a maximum thickness up to 150 mils, or 140 mils, or 130 mils, or 120 mils, or 110 mils, to 100 mils, or 90 mils, or 80 mils, or 70 mils, or 60 mils, or 50 mils, or 40 mils, or 30 mils, or 25 mils, or 20 mils, or 15 mils, or 10 mils, and are environmentally non-persistent.

In embodiments, the cellulose acetate composition and any article made from or comprising such composition comprises biodegradable cellulose acetate (BOA) that contains some recycle content. In embodiments, the recycle content is provided by a reactant derived from recycled material that is the source of one or more acetyl groups on the BOA. In embodiments, the reactant is derived from recycled plastic. In embodiments, the reactant is derived from recycled plastic content syngas. By “recycled plastic content syngas” is meant syngas obtained from a synthesis gas operation utilizing a feedstock that contains at least some content of recycled plastics, as described in the various embodiments more fully herein below. In embodiments, the recycled plastic content syngas can be made in accordance with any of the processes for producing syngas described herein; can comprise, or consist of, any of the syngas compositions or syngas composition streams described herein; or can be made from any of the feedstock compositions described herein.

In embodiments, the feedstock (for the synthesis gas operation) can be in the form of a combination of one or more particulated fossil fuel sources and particulated recycled plastics. In one embodiment or in any of the mentioned embodiments, the solid fossil fuel source can include coal. In embodiments, the feedstock is fed to a gasifier along with an oxidizer gas, and the feedstock is converted to syngas.

In embodiments, the recycled plastic content syngas is utilized to make at least one chemical intermediate in a reaction scheme to make a Recycle BOA. In embodiments, the recycled plastic content syngas can be a component of feedstock (used to make at least one CA intermediate) that includes other sources of syngas, hydrogen, carbon monoxide, or combinations thereof. In one embodiment or in any of the mentioned embodiments, the only source of syngas used to make the CA intermediates is the recycled plastic content syngas.

In embodiments, the CA intermediates made using the recycled content syngas, e.g., recycled plastic content syngas, can be chosen from methanol, acetic acid, methyl acetate, acetic anhydride and combinations thereof. In embodiments, the CA intermediates can be a at least one reactant or at least one product in one or more of the following reactions: (1) syngas conversion to methanol; (2) syngas conversion to acetic acid; (3) methanol conversion to acetic acid, e.g., carbonylation of methanol to produce acetic acid; (4) producing methyl acetate from methanol and acetic acid; and (5) conversion of methyl acetate to acetic anhydride, e.g., carbonylation of methyl acetate and methanol to acetic acid and acetic anhydride.

In embodiments, recycled plastic content syngas is used to produce at least one cellulose reactant. In embodiments, the recycled plastic content syngas is used to produce at least one Recycle BOA.

In embodiments, the recycled plastic content syngas is utilized to make acetic anhydride. In embodiments, syngas that comprises recycled plastic content syngas is first converted to methanol and this methanol is then used in a reaction scheme to make acetic anhydride. “RPS acetic anhydride” refers to acetic anhydride that is derived from recycled plastic content syngas. Derived from means that at least some of the feedstock source material (that is used in any reaction scheme to make a CA intermediate) has some content of recycled plastic content syngas.

In embodiments, the RPS acetic anhydride is utilized as a CA intermediate reactant for the esterification of cellulose to prepare a Recycle BOA, as discussed more fully above. In embodiments, the RPS acetic acid is utilized as a reactant to prepare cellulose acetate or cellulose diacetate.

In embodiments, the Recycle CA is prepared from a cellulose reactant that comprises acetic anhydride that is derived from recycled plastic content syngas.

In embodiments, the recycled plastic content syngas comprises gasification products from a gasification feedstock. In an embodiment, the gasification products are produced by a gasification process using a gasification feedstock that comprises recycled plastics. In embodiments, the gasification feedstock comprises coal.

In embodiments, the gasification feedstock comprises a liquid slurry that comprises coal and recycled plastics. In embodiments, the gasification process comprises gasifying said gasification feedstock in the presence of oxygen.

In one aspect, a Recycle BOA composition is provided that comprises at least one biodegradable cellulose ester having at least one substituent on an anhydroglucose unit (ACU) derived from one or more chemical intermediates, at least one of which is obtained at least hi part from recycled plastic content syngas.

In embodiments, the Recycle BOA is biodegradable and contains content derived from a renewable source, e.g., cellulose from wood or cotton linter, and content derived from a recycled material source, e.g., recycled plastics. Thus, in embodiments, a melt processible material is provided that is biodegradable and contains both renewable and recycled content, i.e., made from renewable and recycled sources.

The biodegradable cellulose acetate useful in embodiments of the present invention can have a degree of substitution in the range of from 1.0 to 2.5. In some cases, the cellulose acetate as described herein may have an average degree of substitution of at least about 1.0, 1.05, 1.1, 1.15, 1.2, 1.25, 1.3, 1.35, 1.4, 1.45 or 1.5 and/or not more than about 2.5, 2.45, 2.4, 2.35, 2.3, 2.25, 2.2, 2.15, 2.1, 2.05, 2.0, 1.95, 1.9, 1.85, 1.8 or 1.75.

In embodiments, the biodegradable cellulose acetate may have a number average molecular weight (Mn) of not more than 100,000, or not more than 90000, measured using gel permeation chromatography with a polystyrene equivalent and using N-methyl-2-pyrrolidone (NMP) as the solvent. In some cases, the biodegradable cellulose acetate may have a Mn of at least about 10,000, at least about 20,000, 25,000, 30,000, 35,000, 40,000, or 45,000 and/or not more than about 100000, 95,000, 90,000, 85,000, 80,000, 75,000, 70,000, 65,000, 60,000, or 50,000.

In embodiments, the BOA containing article can be biodegradable and have a certain degree of degradation. The degree of degradation can be characterized by the weight loss of a sample over a given period of exposure to certain environmental conditions. In some cases, the BOA composition can exhibit a weight loss of at least about 5, 10, 15, or 20 percent after burial in soil for 60 days and/or a weight loss of at least about 15, 20, 25, 30, or 35 percent after 15 days of exposure to a typical municipal composter. However, the rate of degradation may vary depending on the particular end use of the article, as well as the composition of the article, and the specific test. Exemplary test conditions are provided in U.S. Pat. Nos. 5,970,988 and 6,571,802.

In some embodiments, the BOA composition may be in the form of biodegradable single use (formed/molded) articles. It has been found that BOA compositions as described herein can exhibit enhanced levels of environmental non-persistence, characterized by better-than-expected degradation under various environmental conditions. BOA containing articles described herein may meet or exceed passing standards set by international test methods and authorities for industrial compostability, home compostability, and/or soil biodegradability.

To be considered "compostable," a material must meet the following four criteria: (1) the material should pass biodegradation requirement in a test under controlled composting conditions at elevated temperature (58° C.) according to ISO 14855-1 (2012) which correspond to an absolute 90% biodegradation or a relative 90% to a control polymer, (2) the material tested under aerobic composting condition according to ISO16929 (2013) must reach a 90% disintegration; (3) the test material must fulfill all the requirements on volatile solids, heavy metals and fluorine as stipulated by ASTM 06400 (2012), EN 13432 (2000) and ISO 17088 (2012); and (4) the material should not cause negative on plant growth. As used herein, the term "biodegradable" generally refers to the biological conversion and consumption of organic molecules. Biodegradability is an intrinsic property of the material itself, and the material can exhibit different degrees of biodegradability, depending on the specific conditions to which it is exposed. The term "disintegrable" refers to the tendency of a material to physically decompose into smaller fragments when exposed to certain conditions. Disintegration depends both on the material itself, as well as the physical size and configuration of the article being tested. Ecotoxicity measures the impact of the material on plant life, and the heavy metal content of the material is determined according to the procedures laid out in the standard test method.

The CA composition (or article comprising same) can exhibit a biodegradation of at least 70 percent in a period of not more than 50 days, when tested under aerobic composting conditions at ambient temperature (28° C.±2° C.) according to ISO 14855-1 (2012). In some cases, the CA composition (or article comprising same) can exhibit a biodegradation of at least 70 percent in a period of not more than 49, 48, 47, 46, 45, 44, 43, 42, 41, 40, 39, 38, or 37 days when tested under these conditions, also called "home composting conditions." These conditions may not be aqueous or anaerobic. In some cases, the CA composition (or article comprising same) can exhibit a total biodegradation of at least about 71, 72, 73, 74, 75, 76, 77, 78, 79, 80, 81, 82, 83, 84, 85, 86, 87, or 88 percent, when tested under according to ISO 14855-1 (2012) for a period of 50 days under home composting conditions. This may represent a relative biodegradation of at least about 95, 97, 99, 100, 101, 102, or 103 percent, when compared to cellulose subjected to identical test conditions.

To be considered "biodegradable," under home composting conditions according to the French norm NF T 51-800 and the Australian standard AS 5810, a material must exhibit a biodegradation of at least 90 percent hi total (e.g., as compared to the initial sample), or a biodegradation of at least 90 percent of the maximum degradation of a suitable reference material after a plateau has been reached for both the reference and test item. The maximum test duration for biodegradation under home compositing conditions is 1 year. The CA composition as described herein may exhibit a biodegradation of at least 90 percent within not more than 1 year, measured according 14855-1 (2012) under home composting conditions. In some cases, the CA composition (or article comprising same) may exhibit a biodegradation of at least about 91, 92, 93, 94, 95, 96, 97, 98, 99, or 99.5 percent within not more than 1 year, or CA composition (or article comprising same) may exhibit 100 percent biodegradation within not more than 1 year, measured according 14855-1 (2012) under home composting conditions.

Additionally, or in the alternative, the CA composition (or article comprising same) described herein may exhibit a biodegradation of at least 90 percent within not more than about 350, 325, 300, 275, 250, 225, 220, 210, 200, 190, 180, 170, 160, 150, 140, 130, 120, 110, 100, 90, 80, 70, 60, or 50 days, measured according 14855-1 (2012) under home composting conditions. In some cases, the CA composition (or article comprising same) can be at least about 97, 98, 99, or 99.5 percent biodegradable within not more than about 70, 65, 60, or 50 days of testing according to ISO 14855-1 (2012) under home composting conditions. As a result, the CA composition (or article comprising same) may be considered biodegradable according to, for example, French Standard NF T 51-800 and Australian Standard AS 5810 when tested under home composting conditions.

The CA composition (or article comprising same) can exhibit a biodegradation of at least 60 percent in a period of not more than 45 days, when tested under aerobic composting conditions at a temperature of 58° C. (±2° C.) according to ISO 14855-1 (2012). In some cases, the CA composition (or article comprising same) can exhibit a biodegradation of at least 60 percent in a period of not more than 44, 43, 42, 41, 40, 39, 38, 37, 36, 35, 34, 33, 32, 31, 30, 29, 28, or 27 days when tested under these conditions, also called "industrial composting conditions." These may not be aqueous or anaerobic conditions. In some cases, the CA composition (or article comprising same) can exhibit a total biodegradation of at least about 65, 70, 75, 80, 85, 87, 88, 89, 90, 91, 92, 93, 94, or 95 percent, when tested under according to ISO 14855-1 (2012) for a period of 45 days under industrial composting conditions. This may represent a relative biodegradation of at least about 95, 97, 99, 100, 102, 105, 107, 110, 112, 115, 117, or 119 percent, when compared to the same CA composition (or article comprising same) subjected to identical test conditions.

To be considered "biodegradable," under industrial composting conditions according to ASTM 06400 and ISO 17088, at least 90 percent of the organic carbon in the whole item (or for each constituent present in an amount of more than 1% by dry mass) must be converted to carbon dioxide by the end of the test period when compared to the control or in absolute. According to European standard ED 13432 (2000), a material must exhibit a biodegradation of at least 90 percent in total, or a biodegradation of at least 90 percent of the maximum degradation of a suitable reference material after a plateau has been reached for both the reference and test item. The maximum test duration for biodegradability under industrial compositing conditions is 180 days. The CA composition (or article comprising same) described herein may exhibit a biodegradation of at least 90 percent within not more than 180 days, measured according 14855-1 (2012) under industrial composting conditions. In some cases, the CA composition (or article comprising same) may exhibit a biodegradation of at least about 91, 92, 93, 94, 95, 96, 97, 98, 99, or 99.5 percent within not more than 180 days, or CA composition (or article comprising same) may exhibit 100 percent biodegradation within not more than 180 days, measured according 14855-1 (2012) under industrial composting conditions.

Additionally, or in the alternative, CA composition (or article comprising same) described herein may exhibit a biodegradation of least 90 percent within not more than about 175, 170, 165, 160, 155, 150, 145, 140, 135, 130, 125, 120, 115, 110, 105, 100, 95, 90, 85, 80, 75, 70, 65, 60, 55, 50, or 45 days, measured according 14855-1 (2012) under industrial composting conditions. In some cases, the CA composition (or article comprising same) can be at least about 97, 98, 99, or 99.5 percent biodegradable within not more than about 65, 60, 55, 50, or 45 days of testing according to ISO 14855-1 (2012) under industrial composting conditions. As a result, the CA composition (or article comprising same) described herein may be considered biodegradable according ASTM D6400 and ISO 17088 when tested under industrial composting conditions.

The CA composition (or article comprising same) may exhibit a biodegradation in soil of at least 60 percent within not more than 130 days, measured according to ISO 17556 (2012) under aerobic conditions at ambient temperature. In some cases, CA composition (or article comprising same) can exhibit a biodegradation of at least 60 percent in a period of not more than 130, 120, 110, 100, 90, 80, or 75 days when tested under these conditions, also called "soil composting conditions." These may not be aqueous or anaerobic conditions. In some cases, the CA composition (or article comprising same) can exhibit a total biodegradation of at least about 65, 70, 72, 75, 77, 80, 82, or 85 percent, when tested under according to ISO 17556 (2012) for a period of 195 days under soil composting conditions. This may represent a relative biodegradation of at least about 70, 75, 80, 85, 90, or 95 percent, when compared to the same CA composition (or article comprising same) subjected to identical test conditions.

In order to be considered "biodegradable," under soil composting conditions according the OK biodegradable SOIL conformity mark of Vingotte and the DIN Gepruft Biodegradable in soil certification scheme of DIN CERTCO, a material must exhibit a biodegradation of at least 90 percent in total (e.g., as compared to the initial sample), or a biodegradation of at least 90 percent of the maximum degradation of a suitable reference material after a plateau has been reached for both the reference and test item. The maximum test duration for biodegradability under soil composting conditions is 2 years. The CA composition (or article comprising same) as described herein may exhibit a biodegradation of at least 90 percent within not more than 2 years, 1.75 years, 1 year, 9 months, or 6 months measured according ISO 17556 (2012) under soil composting conditions. In some cases, the CA composition (or article comprising same) may exhibit a biodegradation of at least about 91, 92, 93, 94, 95, 96, 97, 98, 99, or 99.5 percent within not more than 2 years, or CA composition (or article comprising same) may exhibit 100 percent biodegradation within not more than 2 years, measured according ISO 17556 (2012) under soil composting conditions.

Additionally, or in the alternative, CA composition (or article comprising same) described herein may exhibit a biodegradation of at least 90 percent within not more than about 700, 650, 600, 550, 500, 450, 400, 350, 300, 275, 250, 240, 230, 220, 210, 200, or 195 days, measured according 17556 (2012) under soil composting conditions. In some cases, the CA composition (or article comprising same) can be at least about 97, 98, 99, or 99.5 percent biodegradable within not more than about 225, 220, 215, 210, 205, 200, or 195 days of testing according to ISO 17556 (2012) under soil composting conditions. As a result, the CA composition (or article comprising same) described herein may meet the requirements to receive The OK biodegradable SOIL conformity mark of Vingotte and to meet the standards of the DIN GeprOft Biodegradable in soil certification scheme of DIN CERTCO.

In some embodiments, CA composition (or article comprising same) of the present invention may include less than 1, 0.75, 0.50, or 0.25 weight percent of components of unknown biodegradability. In some cases, the CA composition (or article comprising same) described herein may include no components of unknown biodegradability.

In addition to being biodegradable under industrial and/or home composting conditions, CA composition (or article comprising same) as described herein may also be compostable under home and/or industrial conditions. As described previously, a material is considered compostable if it meets or exceeds the requirements set forth in EN 13432 for biodegradability, ability to disintegrate, heavy metal content, and ecotoxicity. The CA composition (or article comprising same) described herein may exhibit sufficient compostability under home and/or industrial composting conditions to meet the requirements to receive the OK compost and OK compost HOME conformity marks from Vincotte.

In some cases, the CA composition (or article comprising same) described herein may have a volatile solids concentration, heavy metals and fluorine content that fulfill all of the requirements laid out by EN 13432 (2000). Additionally, the CA composition (or article comprising same) may not cause a negative effect on compost quality (including chemical parameters and ecotoxicity tests).

In some cases, the CA composition (or article comprising same) can exhibit a disintegration of at least 90 percent within not more than 26 weeks, measured according to ISO 16929 (2013) under industrial composting conditions. In some cases, the CA composition (or article comprising same) may exhibit a disintegration of at least about 91, 92, 93, 94, 95, 96, 97, 98, 99, or 99.5 percent under industrial composting conditions within not more than 26 weeks, or CA composition (or article comprising same) may be 100 percent disintegrated under industrial composting conditions within not more than 26 weeks. Alternatively, or in addition, the CA composition (or article comprising same) may exhibit a disintegration of at least 90 percent under industrial compositing conditions within not more than about 26, 25, 24, 23, 22, 21, 20, 19, 18, 17, 16, 15, 14, 13, 12, 11, or 10 weeks, measured according to ISO 16929 (2013). In some cases, the CA composition (or article comprising same) described herein may be at least 97, 98, 99, or 99.5 percent disintegrated within not more than 12, 11, 10, 9, or 8 weeks under industrial composting conditions, measured according to ISO 16929 (2013).

In some cases, the CA composition (or article comprising same) can exhibit a disintegration of at least 90 percent within not more than 26 weeks, measured according to ISO 16929 (2013) under home composting conditions. In some cases, the CA composition (or article comprising same) may exhibit a disintegration of at least about 91, 92, 93, 94, 95, 96, 97, 98, 99, or 99.5 percent under home composting conditions within not more than 26 weeks, or the CA composition (or article comprising same) may be 100 percent disintegrated under home composting conditions within not more than 26 weeks. Alternatively, or in addition, the may exhibit a disintegration of at least 90 percent within not more than about 26, 25, 24, 23, 22, 21, 20, 19, 18, 17, 16, or 15 weeks under home composting conditions, measured according to ISO 16929 (2013). In some cases, the CA composition (or article comprising same) described herein may be at least 97, 98, 99, or 99.5 percent disintegrated within not more than 20, 19, 18, 17, 16, 15, 14, 13, or 12 weeks, measured under home composting conditions according to ISO 16929 (2013).

In embodiments or in combination with any other embodiments, when the CA composition is formed into a film having a thickness of 0.13, or 0.25, or 0.38, or 0.51, or 0.64, or 0.76, or 0.89, or 1.02, or 1.14, or 1.27, or 1.40, or 1.52 mm, the film exhibits greater than 90% disintegration after 12 weeks according to Disintegration Test Protocol, as described in the specification or in the alternative according to ISO 16929 (2013). In certain embodiments, when the CA composition is formed into a film having a thickness of 0.76, or 0.89, or 1.02, or 1.14, or 1.27, or 1.40, or 1.52 mm, the film exhibits greater than 90% disintegration after 12 weeks according to Disintegration Test Protocol, as described in the specification or in the alternative according to ISO 16929 (2013). In certain embodiments, when the CA composition is formed into a film having a thickness of 0.13, or 0.25, or 0.38, or 0.51, or 0.64, or 0.76, or 0.89, or 1.02, or 1.14, or 1.27, or 1.40, or 1.52 mm, the film exhibits greater than 90, or 95, or 96, or 97, or 98, or 99% disintegration after 12 weeks according to Disintegration Test Protocol, as described in the specification or in the alternative according to ISO 16929 (2013). In certain embodiments, when the CA composition is formed into a film having a thickness of 0.13, or 0.25, or 0.38, or 0.51, or 0.64, or 0.76, or 0.89, or 1.02, or 1.14, or 1.27, or 1.40, or 1.52 mm, the film exhibits greater than 90, or 95, or 96, or 97, or 98, or 99% disintegration after 8, or 9, or 10, or 11, or 12, or 13, or 14, or 15, or 16 weeks according to Disintegration Test Protocol, as described in the specification or in the alternative according to ISO 16929 (2013).

In some embodiments, the CA composition (or article comprising same) described herein may be substantially free of photodegradation agents. For example, the CA composition (or article comprising same) may include not more than about 1, 0.75, 0.50, 0.25, 0.10, 0.05, 0.025, 0.01, 0.005, 0.0025, or 0.001 weight percent of photodegradation agent, based on the total weight of the CA composition (or article comprising same), or the CA composition (or article comprising same) may include no photodegradation agents. Examples of such photodegradation agents include, but are not limited to, pigments which act as photooxidation catalysts and are optionally augmented by the presence of one or more metal salts, oxidizable promoters, and combinations thereof. Pigments can include coated or uncoated anatase or rutile titanium dioxide, which may be present alone or in combination with one or more of the augmenting components such as, for example, various types of metals. Other examples of photodegradation agents include benzoins, benzoin alkyl ethers, benzophenone and its derivatives, acetophenone and its derivatives, quinones, thioxanthenes, phthalocyanine and other photosensitizers, ethylene-carbon monoxide copolymer, aromatic ketone-metal salt sensitizers, and combinations thereof.

In an aspect, biodegradable and/or compostable articles are provided that comprise the CA compositions, as described herein. In embodiments, the articles are made from moldable thermoplastic material comprising the CA compositions, as described herein.

In embodiments, the articles are single use food contact articles. Examples of such articles that can be made with the CA compositions include cups, trays, multi-compartment trays, clamshell packaging, candy sticks, films, sheets, trays and lids (e.g., thermoformed), straws, plates, bowls, portion cups, food packaging, liquid carrying containers, solid or gel carrying containers, and cutlery. In embodiments, the articles can be horticultural articles. Examples of such articles that can be made with the CA compositions include plant pots, plant tags, mulch films, and agricultural ground cover.

In another aspect, a CA composition is provided that comprises Recycle BOA prepared by an integrated process which comprises the processing steps of: (1) preparing a recycled plastic content syngas in a synthesis gas operation utilizing a feedstock that contains a solid fossil fuel source and at least some content of recycled plastics; (2) preparing at least one chemical intermediate from said syngas; (3) reacting said chemical intermediate in a reaction scheme to prepare at least one cellulose reactant for preparing a Recycle BOA, and/or selecting said chemical intermediate to be at least one cellulose reactant for preparing a Recycle BOA; and (4) reacting said at least one cellulose reactant to prepare said Recycle BOA; wherein said Recycle BOA comprises at least one substituent on an anhydroglucose unit (AGU) derived from recycled plastic content syngas.

In embodiments, the processing steps (1) to (4) are carried out in a system that is in fluid and/or gaseous communication (i.e., including the possibility of a combination of fluid and gaseous communication). It should be understood that the chemical intermediates, in one or more of the reaction schemes for producing Recycle BCAs starting from recycled plastic content syngas, may be temporarily stored in storage vessels and later reintroduced to the integrated process system.

In embodiments, the at least one chemical intermediate is chosen from methanol, methyl acetate, acetic anhydride, acetic acid, or combinations thereof. In embodiments, one chemical intermediate is methanol, and the methanol is used in a reaction scheme to make a second chemical intermediate that is acetic anhydride. In embodiments, the cellulose reactant is acetic anhydride.

In embodiments, the cellulose ester composition comprises BOA (as described herein), a plasticizer composition and a stabilizer composition, wherein the plasticizer composition comprises one or more food grade plasticizers and is present in an amount from 13 to 25, or 14 to 25, or 15 to 25, or 16 to 25, or 17 to 25, or 13 to 23, or 14 to 22, or 15 to 23, or 13 to 20, or 14 to 20, or 15 to 20, or 16 to 20, or 17 to 20, or 13 to 17, or 14 to 17, or 15 to 17, or 13 to less than 17, or 14 to less than 17, or 15 to less than 17 wt %, based on the total weight of the cellulose ester composition; and wherein the stabilizer composition comprises one or more secondary antioxidants and is present in an amount from 0.08 to 0.8, or 0.08 to 0.7, or 0.08 to 0.6 wt %, based on the total weight of the cellulose ester composition.

In embodiments, the plasticizer composition comprises triacetin in an amount from 15 to 20, or 16 to 19 wt %, based on the total weight of the cellulose ester composition; and the stabilizer composition comprises one or more secondary antioxidants in an amount from 0.1 to 0.4, or 0.1 to 0.3 wt % and one or more primary antioxidants in an amount from 0.1 to 0.4, or 0.2 to 0.4 wt %, where wt % is based on the total weight of the cellulose ester composition. In one class of this embodiment, the one or more secondary antioxidants comprises a phosphite compound (e.g., Weston 705T or Doverphos S-9228T), DLTDP or a combination thereof and the one or more primary antioxidants comprises Irganox 1010, BHT or a combination thereof. In embodiments, the cellulose ester composition has a b* less than 40, or less than 35, or less than 30, or less than 25, or less than 20, or less than 15 after normal cycle time during injection molding (as described in the examples); or has a b* less than 40, or less than 35, or less than 30, or less than 25, or less than 20 after doubling the cycle time during injection molding (as described in the examples).

In embodiments, the plasticizer composition comprises polyethylene glycol an average molecular weight of from 300 to 500 Daltons in an amount from 13 to 23, or 13 to 20, or 13 to less than 17, or greater than 15 to 23, or 17 to 23, or 17 to 20 wt %, based on the total weight of the cellulose ester composition; and the stabilizer composition comprises one or more secondary antioxidants in an amount from 0.01 to 0.8, or 0.1 to 0.5, or 0.1 to 0.3, or 0.1 to 0.2 wt %, based on the total weight of the cellulose ester composition. In one class of this embodiment, the one or more secondary antioxidants comprises a phosphite compound (e.g., Weston 705T or Doverphos S-9228T), DLTDP or a combination thereof. In another class of this embodiment, the stabilizer composition further comprises one or more primary antioxidants (e.g., Irganox 1010 or BHT), citric acid or a combination thereof, wherein the one or more primary antioxidants are present in an amount from 0.1 to 0.5, or 0.1 to 0.4 wt %, based on the total weight of the cellulose acetate composition, and wherein the citric acid is present in an amount from 0.05 to 0.2, or 0.05 to 0.15 wt %, based on the total weight of the cellulose acetate composition.

In embodiments, the plasticizer composition comprises polyethylene glycol an average molecular weight of from 300 to 500 Daltons in an amount from 13 to less than 17, or 14 to less than 17, or 15 to less than 17 wt %, based on the total weight of the cellulose ester composition; and the stabilizer composition comprises one or more secondary antioxidants in an amount from 0.1 to 0.5, or 0.1 to 0.3, or 0.1 to 0.2 wt %, based on the total weight of the cellulose ester composition.

In embodiments, the plasticizer composition comprises polyethylene glycol an average molecular weight of from 300 to 500 Daltons in an amount from greater than 15 to 23, or greater than 15 to 20 wt %, based on the total weight of the cellulose ester composition; and the stabilizer composition a first stabilizer component that comprises one or more secondary antioxidants in an amount from 0.1 to 0.5, or 0.1 to 0.3, or 0.1 to 0.2 wt %, based on the total weight of the cellulose ester composition; and a second stabilizer component that comprises one or more primary antioxidants (e.g., Irganox 1010 or BHT), citric acid or a combination thereof, wherein the one or more primary antioxidants (if present) are present in an amount from 0.1 to 0.5, or 0.1 to 0.4 wt %, based on the total weight of the cellulose acetate composition, and wherein the citric acid (if present) is present in an amount from 0.05 to 0.2, or 0.05 to 0.15 wt %, based on the total weight of the cellulose acetate composition.

PEG/MPEG Specific Compositions

The present application also discloses a composition comprising: (1) a cellulose acetate, wherein the cellulose acetate has an acetyl degree of substitution ("$DS_{Ac}$") in the range of from 2.2 to 2.6, and (2) from 17-23 wt % of a polyethylene glycol or a methoxy polyethylene glycol composition having an average molecular weight of from 300 Daltons to 550 Daltons, wherein the composition is melt processable, biodegradable, and disintegratable.

In one embodiment or in combination with any other embodiment, the composition comprises polyethylene glycol having an average molecular weight of from 300 to 500 Daltons.

In one embodiment or in combination with any other embodiment, the composition comprises polyethylene glycol having an average molecular weight of from 350 to 550 Daltons.

In one embodiment or in combination with any other embodiment, the cellulose acetate has a number average molecular weight ("$M_n$") in the range of from 10,000 to 90,000 Daltons, as measured by GPO. In one embodiment or in combination with any other embodiment, the cellulose acetate has a number average molecular weight ("$M_n$") in the range of from 30,000 to 90,000 Daltons, as measured by GPO. In one embodiment or in combination with any other embodiment, the cellulose acetate has a number average molecular weight ("$M_n$") in the range of from 40,000 to 90,000 Daltons, as measured by GPC.

In one embodiment or in combination with any other embodiment, wherein when the composition is formed into a film having a thickness of 0.38 mm, the film exhibits greater than 5% disintegration after 6 weeks and greater than 90% disintegration after 12 weeks according to the Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 10% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 20% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 30% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 50% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 70% disintegration after 6 weeks and greater than 90% disintegration after 12 weeks according to Disintegration Test Protocol, as described in the specification or in the alternative according to ISO 16929 (2013).

In one embodiment or in combination with any other embodiment, when the composition is formed into a film having a thickness of 0.76 mm, the film exhibits greater than 30% disintegration after 12 weeks according to Disintegration Test Protocol, as described in the specification or in the alternative according to ISO 16929 (2013). In one embodiment or in combination with any other embodiment, when the composition is formed into a film having a thickness of 0.76 mm, the film exhibits greater than 50% disintegration after 12 weeks according to Disintegration Test Protocol, as described in the specification or in the alternative according to ISO 16929 (2013). In one embodiment or in combination with any other embodiment, when the composition is formed into a film having a thickness of 0.76 mm, the film exhibits greater than 70% disintegration after 12 weeks according to Disintegration Test Protocol, as described in the specification or in the alternative according to ISO 16929 (2013). In one embodiment or in combination with any other embodiment, when the composition is formed into a film having a thickness of 0.76 mm, the film exhibits greater than 90% disintegration after 12 weeks according to Disintegration Test Protocol, as described in the specification or in the alternative according to ISO 16929 (2013). In one embodiment or in combination with any other embodiment, when the composition is formed into a film having a thickness of 0.76 mm, the film exhibits greater than 95% disintegration after 12 weeks according to Disintegration Test protocol, as described in the specification or in the alternative according to ISO 16929 (2013).

In one embodiment or in combination with any other embodiment, the composition further comprises at least one additional component chosen from a filler, an additive, a biopolymer, a stabilizer, or an odor modifier.

In one embodiment or in combination with any other embodiment, the composition further comprises a filler in an amount of from 1 to 60 wt %, based on the total weight of the composition. In one class of this embodiment, the filler is a carbohydrate, a cellulosic filler, an inorganic filler, a food byproduct, a desiccant, an alkaline filler, or combinations thereof.

In one subclass of this class, the filler is an inorganic filler. In one sub-subclass of this subclass, the inorganic filer is calcium carbonate.

In one subclass of this class, the filler is a carbohydrate. In one subclass of this class, the filler is a cellulosic filler. In one subclass of this class, the filler is a food byproduct. In one subclass of this class, the filler is a desiccant. In one subclass of this class, the filler is an alkaline filler.

In one embodiment or in combination with any other embodiment, the composition further comprises an odor modifying additive in an amount of from 0.001 to 1 wt %, based on the total weight of the composition. In one class of this embodiment, the odor modifying additive is vanillin, Pennyroyal M-1178, almond, cinnamyl, spices, spice extracts, volatile organic compounds or small molecules, or Plastidor. In one subclass of this class, the odor modifying additive is vanillin.

In one embodiment or in combination with any other embodiment, the composition further comprises a stabilizer in an amount from 0.01 to 5 wt %, based on the total composition. In one class of this embodiment, the stabilizer is a UV absorber, an antioxidant (e.g., ascorbic acid, BHT, BHA, etc), an acid scavenger, a radical scavenger, an epoxidized oil (e.g., epoxidized soybean oil, epoxidized linseed oil, epoxidized sunflower oil), or combinations.

The present application also discloses an article comprising a composition comprising: (1) a cellulose acetate, wherein the cellulose acetate has an acetyl degree of substitution ("$DS_{Ac}$") in the range of from 2.2 to 2.6, and (2) from 17-23 wt % of a polyethylene glycol or a methoxy polyethylene glycol composition having an average molecular weight of from 300 Daltons to 550 Daltons, wherein the composition is melt processable, biodegradable, and disintegratable.

In one embodiment or in combination with any other embodiment, the composition comprises polyethylene glycol having an average molecular weight of from 300 to 500 Daltons. In one embodiment or in combination with any other embodiment, the composition comprises polyethylene glycol having an average molecular weight of from 350 to 550 Daltons.

In one embodiment or in combination with any other embodiment, the article is formed from an orienting process, an extrusion process, an injection molding process, a blow molding process, or a thermoforming process. In one class of this embodiment, the article is formed from the orienting process. In one subclass of this class, the orienting process is a uniaxial stretching process or a biaxial stretching process.

In one class of this embodiment, the article is formed from the extrusion process. In one class of this embodiment, the article is formed from the injection molding process. In one class of this embodiment, the article is formed from the blow molding process. In one class of this embodiment, the article is formed from a thermoforming process. In one subclass of this class, the film or sheet used to form the article is from 10 to 160 mil thick.

In one embodiment or in combination with any other embodiment, when the article is clear, the article exhibits a haze of less than 10%. In one embodiment or in combination with any other embodiment, when the article is clear, the article exhibits a haze of less than 8%. In one embodiment or in combination with any other embodiment, when the article is clear, the article exhibits a haze of less than 6%. In one embodiment or in combination with any other embodiment, when the article is clear, the article exhibits a haze of less than 5%. In one embodiment or in combination with any other embodiment, when the article is clear, the article exhibits a haze of less than 4%. In one embodiment or in combination with any other embodiment, when the article is clear, the article exhibits a haze of less than 3%. In one embodiment, when the article is clear, the article exhibits a haze of less than 2%. In one embodiment or in combination with any other embodiment, when the article is clear, the article exhibits a haze of less than 1%.

In one embodiment or in combination with any other embodiment, wherein when the composition is formed into a film having a thickness of 0.38 mm, the film exhibits greater than 5% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 10% disintegration after 6 weeks and greater than 90% disintegration after 12 weeks according to Disintegration Test Protocol, as described in the specification or in the alternative according to ISO 16929 (2013), In one embodiment or in combination with any other embodiment, wherein when the composition is formed into a film having a thickness of 0.38 mm, the film exhibits greater than 20% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 30% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 50% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 70% disintegration after 6 weeks and greater than 90% disintegration after 12 weeks according to Disintegration Test Protocol, as described in the specification or in the alternative according to ISO 16929 (2013).

In one embodiment or in combination with any other embodiment, when the composition is formed into a film having a thickness of 0.76 mm, the film exhibits greater than 30% disintegration after 12 weeks according to Disintegration Test Protocol, as described in the specification or in the alternative according to ISO 16929 (2013). In one embodiment or in combination with any other embodiment, when the composition is formed into a film having a thickness of 0.76 mm, the film exhibits greater than 50% disintegration after 12 weeks according to Disintegration Test Protocol, as described in the specification or in the alternative according to ISO 16929 (2013). In one embodiment or in combination with any other embodiment, when the composition is formed into a film having a thickness of 0.76 mm, the film exhibits greater than 70% disintegration after 12 weeks according to Disintegration Test Protocol, as described in the specification or in the alternative according to ISO 16929 (2013). In one embodiment or in combination with any other embodiment, when the composition is formed into a film having a thickness of 0.76 mm, the film exhibits greater than 90% disintegration after 12 weeks according to Disintegration Test Protocol, as described in the specification or in the alternative according to ISO 16929 (2013). In one embodiment or in combination with any other embodiment, when the composition is formed into a film having a thickness of 0.76 mm, the film exhibits greater than 95% disintegration after 12 weeks according to Disintegration Test Protocol, as described in the specification or in the alternative according to ISO 16929 (2013).

In one embodiment or in combination with any other embodiment, the article exhibits greater than 30% disintegration after 12 weeks according to Disintegration Test Protocol, as described in the specification or in the alternative according to ISO 16929 (2013). In one embodiment or in combination with any other embodiment, the article exhibits greater than 50% disintegration after 12 weeks according to Disintegration Test Protocol, as described in the specification or in the alternative according to ISO 16929 (2013). In one embodiment or in combination with any other embodiment, the article exhibits greater than 70% disintegration after 12 weeks according to Disintegration Test Protocol, as described in the specification or in the alternative according to ISO 16929 (2013). In one embodiment or in combination with any other embodiment, the article exhibits greater than 80% disintegration after 12 weeks according to Disintegration Test Protocol, as described in the specification or in the alternative according to ISO 16929 (2013). In one embodiment or in combination with any other embodiment, the article exhibits greater than 90% disintegration after 12 weeks according to Disintegration Test Protocol, as described in the specification or in the alternative according to ISO 16929 (2013). In one embodiment or in combination with any other embodiment, the article exhibits greater than 95% disintegration after 12 weeks according to Disintegration Test Protocol, as described in the specification or in the alternative according to ISO 16929 (2013).

In one embodiment or in combination with any other embodiment, the article has a thickness of 0.8 mm or less. In one embodiment, the article has a thickness of 0.76 mm or less.

In one embodiment or in combination with any other embodiment, the composition further comprises at least one additional component chosen from a tiller, an additive, a biopolymer, a stabilizer, or an odor modifier.

In one embodiment or in combination with any other embodiment, the composition further comprises a filler in an amount of from 1 to 60 wt %, based on the total weight of the composition. In one class of this embodiment, the filler is a carbohydrate, a cellulosic filler, an inorganic filler, a food byproduct, a desiccant, an alkaline filler, or combinations thereof.

In one subclass of this class, the filler is an inorganic filler. In one sub-subclass of this subclass, the inorganic filer is calcium carbonate.

In one subclass of this class, the filler is a carbohydrate. In one subclass of this class, the filler is a cellulosic filler. In one subclass of this class, the filler is a food byproduct. In one subclass of this class, the filler is a desiccant. In one subclass of this class, the filler is an alkaline filler.

In one embodiment or in combination with any other embodiment, the composition further comprises an odor modifying additive in an amount of from 0.001 to 1 wt %, based on the total weight of the composition. In one class of this embodiment, the odor modifying additive is vanillin, Pennyroyal M-1178, almond, cinnamyl, spices, spice extracts, volatile organic compounds or small molecules, or Plastidor. In one subclass of this class, the odor modifying additive is vanillin.

In one embodiment or in combination with any other embodiment, the composition further comprises a stabilizer in an amount from 0.01 to 5 wt %, based on the total composition. In one class of this embodiment, the stabilizer is a UV absorber, an antioxidant (e.g., ascorbic acid, BHT, BHA, etc), an acid scavenger, a radical scavenger, an epoxidized oil (e.g., epoxidized soybean oil, epoxidized linseed oil, epoxidized sunflower oil), or combinations.

The present application also discloses an article comprising a composition comprising: (1) a cellulose acetate, wherein the cellulose acetate has an acetyl degree of substitution ("$DS_{Ac}$") in the range of from 2.2 to 2.6, (2) from 13-23 wt % of a polyethylene glycol or a methoxy polyethylene glycol composition having an average molecular weight of from 300 Daltons to 550 Daltons, and (3) 0.01-1.8 wt % of an additive chosen from an epoxidized soybean oil, a secondary antioxidant, or a combination, wherein the composition is melt processable, biodegradable, and disintegratable.

In one embodiment or in combination with any other embodiment, the additive is present at from 0.01 to 1 wt %, or 0.05 to 0.8 wt %, or 0.05 to 0.5 wt %, or 0.1 to 1 wt %.

In one embodiment or in combination with any other embodiment, the additive is an epoxidized soybean oil which is present at 0.1 to 1 wt %, or 0.1 to 0.5 wt %, or 0.5 to 1 wt %, or 0.3 to 0.8 wt %.

In one embodiment or in combination with any other embodiment, the additive is a secondary antioxidant which is present at 0.01 to 0.8 wt %, or 0.01 to 0.4 wt %, or 0.4 to 0.8 wt %, or 0.2 to 0.6 wt %.

In one embodiment or in combination with any other embodiment, the composition comprises polyethylene glycol having an average molecular weight of from 300 to 500 Daltons. In one embodiment or in combination with any other embodiment, the composition comprises polyethylene glycol having an average molecular weight of from 350 to 550 Daltons.

In one embodiment or in combination with any other embodiment, the article is formed from an orienting process, an extrusion process, an injection molding process, a blow molding process, or a thermoforming process. In one class of this embodiment, the article is formed from the orienting process. In one subclass of this class, the orienting process is a uniaxial stretching process or a biaxial stretching process.

In one class of this embodiment, the article is formed from the extrusion process. In one class of this embodiment, the article is formed from the injection molding process. In one class of this embodiment, the article is formed from the blow molding process. In one class of this embodiment, the article is formed from a thermoforming process. In one subclass of this class, the film or sheet used to form the article is from 10 to 160 mil thick.

In one embodiment or in combination with any other embodiment, when the article is clear, the article exhibits a haze of less than 10%. In one embodiment or in combination with any other embodiment, when the article is clear, the article exhibits a haze of less than 8%. In one embodiment or in combination with any other embodiment, when the article is clear, the article exhibits a haze of less than 6%. In one embodiment or in combination with any other embodiment, when the article is clear, the article exhibits a haze of less than 5%. In one embodiment or in combination with any other embodiment, when the article is clear, the article exhibits a haze of less than 4%. In one embodiment or in combination with any other embodiment, when the article is clear, the article exhibits a haze of less than 3%. In one embodiment, when the article is clear, the article exhibits a haze of less than 2%. In one embodiment or in combination with any other embodiment, when the article is clear, the article exhibits a haze of less than 1%.

In one embodiment or in combination with any other embodiment, wherein when the composition is formed into a film having a thickness of 0.38 mm, the film exhibits greater than 5% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 10% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 20% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 30% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 50% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a film having a thickness of 0.38 mm, the film exhibits greater than 70% disintegration after 6 weeks and greater than 90% disintegration after 12 weeks according to Disintegration Test Protocol, as described in the specification or in the alternative according to ISO 16929 (2013).

In one embodiment or in combination with any other embodiment, when the composition is formed into a film having a thickness of 0.76 mm, the film exhibits greater than 30% disintegration after 12 weeks according to Disintegration Test Protocol, as described in the specification or in the alternative according to ISO 16929 (2013), In one embodiment or in combination with any other embodiment, when the composition is formed into a film having a thickness of 0.76 mm, the film exhibits greater than 50% disintegration after 12 weeks according to Disintegration Test Protocol, as described in the specification or in the alternative according to ISO 16929 (2013). In one embodiment or in combination with any other embodiment, when the composition is formed into a film having a thickness of 0.76 mm, the film exhibits greater than 70% disintegration after 12 weeks according to Disintegration Test Protocol, as described in the specification or in the alternative according to ISO 16929 (2013), In one embodiment or in combination with any other embodiment, when the composition is formed into a film having a thickness of 0.76 mm, the film exhibits greater than 90% disintegration after 12 weeks according to Disintegration Test Protocol, as described in the specification or in the alternative according to ISO 16929 (2013). In one embodiment or in combination with any other embodiment, when the composition is formed into a film having a thickness of 0.76 mm, the film exhibits greater than 95% disintegration after 12 weeks according to Disintegration Test Protocol, as described in the specification or in the alternative according to ISO 16929 (2013).

In one embodiment or in combination with any other embodiment, the article exhibits greater than 30% disintegration after 12 weeks according to Disintegration Test Protocol, as described in the specification or in the alternative according to ISO 16929 (2013). In one embodiment or in combination with any other embodiment, the article exhibits greater than 50% disintegration after 12 weeks according to Disintegration Test Protocol, as described in the specification or in the alternative according to ISO 16929 (2013). In one embodiment or in combination with any other embodiment, the article exhibits greater than 70% disintegration after 12 weeks according to Disintegration Test Protocol, as described in the specification or in the alternative according to ISO 16929 (2013). In one embodiment or in combination with any other embodiment, the article exhibits greater than 80% disintegration after 12 weeks according to Disintegration Test Protocol, as described in the specification or hi the alternative according to ISO 16929 (2013). In one embodiment or in combination with any other embodiment, the article exhibits greater than 90% disintegration after 12 weeks according to Disintegration Test Protocol, as described in the specification or in the alternative according to ISO 16929 (2013). In one embodiment or in combination with any other embodiment, the article exhibits greater than 95% disintegration after 12 weeks according to Disintegration Test Protocol, as described in the specification or in the alternative according to ISO 16929 (2013).

In one embodiment or in combination with any other embodiment, the article has a thickness of 0.8 mm or less. In one embodiment, the article has a thickness of 0.76 mm or less.

In one embodiment or in combination with any other embodiment, the composition further comprises at least one additional component chosen from a filler, an additive, a biopolymer, a stabilizer, or an odor modifier.

In one embodiment or in combination with any other embodiment, the composition further comprises a filler in an amount of from 1 to 60 wt %, based on the total weight of the composition. In one class of this embodiment, the filler is a carbohydrate, a cellulosic filler, an inorganic filler, a food byproduct, a desiccant, an alkaline filler, or combinations thereof.

In one subclass of this class, the filler is an inorganic filler. In one sub-subclass of this subclass, the inorganic filer is calcium carbonate.

In one subclass of this class, the filler is a carbohydrate. In one subclass of this class, the filler is a cellulosic filler. In one subclass of this class, the filler is a food byproduct. In one subclass of this class, the filler is a desiccant. In one subclass of this class, the filler is an alkaline filler.

In one embodiment or in combination with any other embodiment, the composition further comprises an odor modifying additive in an amount of from 0.001 to 1 wt %, based on the total weight of the composition. In one class of this embodiment, the odor modifying additive is vanillin, Pennyroyal M-1178, almond, cinnamyl, spices, spice extracts, volatile organic compounds or small molecules, or Plastidor. In one subclass of this class, the odor modifying additive is vanillin.

The present application discloses a foamable composition, comprising: (1) a cellulose acetate having a degree of substitution of acetyl ($DS_{Ac}$) between 2.2 to 2.6; (2) 5 to 40 wt % of a plasticizer; (3) 0.1 to 3 wt % of a nucleating agent; and (4) 0.1 to 3 wt % a chemical blowing composition, comprises: (i) 25 to 75 wt % of a blowing agent, and (ii) 25 to 75 wt % of a carrier polymer having a melting point that is no more than 150° C., wherein the proportions of the blowing agent and the carrier polymer are based on the total weight of the chemical blowing composition; wherein the proportions of the cellulose acetate, plasticizer, nucleating agent and chemical blowing composition are based on the total weight of the foamable composition.

In one embodiment or in combination with any other embodiment, the foamable composition exhibits a heat deflection temperature of greater than 100° C. as measured at 0.45 MPa at 2% elongation with a 1 Hz frequency using a DMA. In one embodiment or in combination with any other embodiment, the foamable composition exhibits a heat deflection temperature of greater than 102° C. as measured at 0.45 MPa at 2% elongation with a 1 Hz frequency using a DMA. In one embodiment or in combination with any other embodiment, the foamable composition exhibits a heat deflection temperature of greater than 104° C. as measured at 0.45 MPa at 2% elongation with a 1 Hz frequency using a DMA. In one embodiment or in combination with any other embodiment, the foamable composition exhibits a heat deflection temperature of greater than 106° C. as measured at 0.45 MPa at 2% elongation with a 1 Hz frequency using a DMA. In one embodiment or in combination with any other embodiment, the foamable composition exhibits a heat deflection temperature of greater than 110° C. as measured at 0.45 MPa at 2% elongation with a 1 Hz frequency using a DMA. In one embodiment or in combination with any other embodiment, the foamable composition exhibits a heat deflection temperature of greater than 115° C. as measured at 0.45 MPa at 2% elongation with a 1 Hz frequency using a DMA.

In one embodiment or in combination with any other embodiment, the blowing agent comprises sodium bicarbonate, citric acid or combination thereof. In one class of this embodiment, the blowing agent comprises sodium bicarbonate. In one class of this embodiment, the blowing agent comprises citric acid.

In one embodiment or in combination with any other embodiment, the carrier polymer comprises polybutylene succinate, polycaprolactone, or combinations thereof. In one class of this embodiment, the carrier polymer comprises polybutylene succinate. In one class of this embodiment, the carrier polymer comprises polycaprolactone.

In one embodiment or in combination with any other embodiment, the plasticizer comprises triacetin, methyl citrate, or PEG400.

In one class of this embodiment, the plasticizer is present in a range of from 13 to 23, or 17 to 23 wt %. In one class of this embodiment, the plasticizer is present in a range of from 13 to 30, or 15 to 30 wt %.

In one class of this embodiment, the plasticizer comprises triacetin.

In one subclass of this class, the plasticizer is present in a range of from 13 to 23, or 15 to 23, or 17 to 23 wt %. In one subclass of this class, the plasticizer is present in a range of from 13 to 30, or 15 to 30 wt %.

In one class of this embodiment, the plasticizer comprises triethyl citrate. In one subclass of this class, the plasticizer is present in a range of from 13 to 23, or 15 to 23, or 17 to 23 wt %. In one subclass of this class, the plasticizer is present in a range of from 13 to 30, or 15 to 30 wt %.

In one class of this embodiment, the plasticizer comprises PEG400. In one subclass of this class, the plasticizer is present in a range of from 13 to less than 17, or 17 to 23 wt %. In one subclass of this class, the plasticizer is present in a range of from 13 to 30, or 15 to 30 wt %.

In one embodiment or in combination with any other embodiment, the nucleating agent comprises a magnesium silicate, a silicon dioxide, a magnesium oxide, or combinations thereof. In one class of this embodiment, the nucleating agent comprises a particulate composition with a median particle size less than 2 microns. In one class of this embodiment, the nucleating agent comprises a particulate composition with a median particle size less than 1.5 microns. In one class of this embodiment, the nucleating agent comprises a particulate composition with a median particle size less than 1.1 microns.

In one class of this embodiment, the nucleating agent comprises a magnesium silicate. In one subclass of this class, the nucleating agent comprises a particulate composition with a median particle size less than 2 microns. In one subclass of this class, the nucleating agent comprises a particulate composition with a median particle size less than 1.5 microns. In one subclass of this class, the nucleating agent comprises a particulate composition with a median particle size less than 1.1 microns.

In one class of this embodiment, the nucleating agent comprises a silicon dioxide. In one subclass of this class, the nucleating agent comprises a particulate composition with a median particle size less than 2 microns. In one subclass of this class, the nucleating agent comprises a particulate composition with a median particle size less than 1.5 microns. In one subclass of this class, the nucleating agent comprises a particulate composition with a median particle size less than 1.1 microns.

In one class of this embodiment, the nucleating agent comprises a magnesium oxide. In one subclass of this class, the nucleating agent comprises a particulate composition with a median particle size less than 2 microns. In one subclass of this class, the nucleating agent comprises a particulate composition with a median particle size less than 1.5 microns. In one subclass of this class, the nucleating agent comprises a particulate composition with a median particle size less than 1.1 microns.

In one embodiment or in combination with any other embodiment, the nucleating agent comprises a particulate composition with a median particle size less than 2 microns. In one embodiment, the nucleating agent comprises a particulate composition with a median particle size less than 1.5 microns. the nucleating agent comprises a particulate composition with a median particle size less than 1.1 microns.

In one embodiment or in combination with any other embodiment, the foamable composition further comprises a fiber. In one class of this embodiment, the fiber comprises hemp, bast, jute, flax, ramie, kenaf, sisal, bamboo, or wood cellulose fibers. In one subclass of this class, the fiber comprises hemp.

In one embodiment or in combination with any other embodiment, the foamable composition further comprises a photodegradation catalyst. In one class of this embodiment, the photodegradation catalyst is a titanium dioxide, or an iron oxide. In one subclass of this class, the photodegradation catalyst is a titanium dioxide. In one subclass of this class, the photodegradation catalyst is an iron oxide.

In one embodiment or in combination with any other embodiment, the foamable composition further comprises a pigment. In one class of this embodiment, the pigment is a titanium dioxide, a carbon black, or an iron oxide. In one subclass of this class, the pigment is a titanium dioxide. In one subclass of this class, the pigment is a carbon black. In one subclass of this class, the pigment is an iron oxide.

In one embodiment or in combination with any other embodiment, the foamable composition is biodegradable.

In one embodiment or in combination with any other embodiment, the foamable composition comprises two or more cellulose acetates having different degrees of substitution of acetyl.

In one embodiment or in combination with any other embodiment, the foamable composition further comprises a biodegradable polymer that is different than the cellulose acetate.

In one embodiment or in combination with any other embodiment, there is an article prepared from the any one of the previously described foamable compositions, wherein the article is a foam.

In one class of this embodiment, the article has a thickness of up to 8 mm.

In one class of this embodiment, the article has one or more skin layers. The skin layer may be found on the outer surface of the article or foam. The skin layer can also be found in the middle of the foam.

In one class of this embodiment, the article is biodegradable.

In one class of this embodiment, the article has a density less than 0.9 g/cm$^3$. In one class of this embodiment, the article has a density of less than 0.8 g/cm$^3$. In one class of this embodiment, the article has a density of less than 0.7 g/cm$^3$. In one class of this embodiment, the article has a density of less than 0.6 g/cm$^3$. In one class of this embodiment, the article has a density of less than 0.5 g/cm$^3$. In one class of this embodiment, the article has a density of less than 0.4 g/cm$^3$. In one class of this embodiment, the article has a density of less than 0.3 g/cm$^3$. In one class of this embodiment, the article has a density of less than 0.2 g/cm$^3$. In one class of this embodiment, the article has a density of less than 0.1 g/cm$^3$. In one class of this embodiment, the article has a density of less than 0.05 g/cm$^3$. In one class of this embodiment, the article has a density in the range of from 0.2 to 0.9 g/cm$^3$.

In one class of this embodiment, the article is industrial compostable or home compostable. In one subclass of this class, the article is industrial compostable. In one sub-subclass of this subclass, the article has a thickness that is less than 1.1 mm. In one subclass of this class, the article is home compostable. In one sub-subclass of this subclass, the article has a thickness that is less than 1.1 mm. In one sub-subclass of this subclass, the article has a thickness that is less than 0.8 mm. In one sub-subclass of this subclass, the article has a thickness that is less than 0.6 mm. In one sub-subclass of this subclass, the article has a thickness that is less than 0.4 mm.

In one embodiment or in combination with any other embodiment, wherein when the composition is formed into a foam having a thickness of 0.38 mm, the foam exhibits greater than 5% disintegration after 6 weeks and greater than 90% disintegration after 12 weeks according to the Disintegration Test Protocol, as described in the specification or in the alternative according to ISO 16929 (2013). In one embodiment or in combination with any other embodiment, wherein when the composition is formed into a foam having a thickness of 0.38 mm, the foam exhibits greater than 10% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a foam having a thickness of 0.38 mm, the foam exhibits greater than 20% disintegration after 6 weeks and greater than 90% disintegration after 12 weeks according to Disintegration Test Protocol, as described hi the specification or in the alternative according to ISO 16929 (2013). In one embodiment or in combination with any other embodiment, wherein when the composition is formed into a foam having a thickness of 0.38 mm, the foam exhibits greater than 30% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a foam having a thickness of 0.38 mm, the foam exhibits greater than 50% disintegration after 6 weeks and greater than 90% disintegration after 12 weeks according to Disintegration Test Protocol, as described in the specification or in the alternative according to ISO 16929 (2013). In one embodiment or in combination with any other embodiment, wherein when the composition is formed into a foam having a thickness of 0.38 mm, the foam exhibits greater than 70% disintegration after 6 weeks and greater than 90% disintegration after 12 weeks according to Disintegration Test Protocol, as described in the specification or in the alternative according to ISO 16929 (2013).

In one embodiment or in combination with any other embodiment, when the composition is formed into a foam having a thickness of 9.76 mm, the foam exhibits greater than 30% disintegration after 12 weeks according to Disintegration Test Protocol, as described in the specification or in the alternative according to ISO 16929 (2013). In one embodiment or in combination with any other embodiment, when the composition is formed into a foam having a thickness of 0.76 mm, the foam exhibits greater than 50% disintegration after 12 weeks according to Disintegration Test Protocol, as described in the specification or in the alternative according to ISO 16929 (2013). In one embodiment or in combination with any other embodiment, when the composition is formed into a foam having a thickness of 0.76 mm, the foam exhibits greater than 70% disintegration after 12 weeks according to Disintegration Test Protocol, as described in the specification or in the alternative according to ISO 16929 (2013). In one embodiment or in combination with any other embodiment, when the composition is formed into a foam having a thickness of 0.76 mm, the foam exhibits greater than 90% disintegration after 12 weeks according to Disintegration Test Protocol, as described in the specification or in the alternative according to ISO 16929 (2013). In one embodiment or in combination with any other embodiment, when the composition is formed into a foam having a thickness of 0.76 mm, the foam exhibits greater than 95% disintegration after 12 weeks according to Disintegration Test protocol, as described in the specification or in the alternative according to ISO 16929 (2013).

The present application discloses a foamable composition comprising: (1) a cellulose acetate having a degree of substitution of acetyl ($DS_{Ac}$) between 2.2 to 2.6; (2) 5 to 40 wt % of a plasticizer; (3) 0.1 to 3 wt % of a nucleating agent; and (4) 0.1 to 15 wt % of a physical blowing agent, wherein the proportions of the cellulose acetate; plasticizer; nucleating agent and physical blowing agent are based on the total weight of the foamable composition.

In one embodiment or in combination with any other embodiment, the foamable composition exhibits a heat deflection temperature of greater than 100° C. as measured at 0.45 MPa at 2% elongation with a 1 Hz frequency using a DMA. In one embodiment or in combination with any other embodiment, the foamable composition exhibits a heat deflection temperature of greater than 102° C. as measured at 0.45 MPa at 2% elongation with a 1 Hz frequency using a DMA. In one embodiment or in combination with any other embodiment, the foamable composition exhibits a heat deflection temperature of greater than 104° C. as measured at 0.45 MPa at 2% elongation with a 1 Hz frequency using a DMA. In one embodiment or in combination with any other embodiment, the foamable composition exhibits a heat deflection temperature of greater than 106° C. as measured at 0.45 MPa at 2% elongation with a 1 Hz frequency using a DMA. In one embodiment or in combination with any other embodiment, the foamable composition exhibits a heat deflection temperature of greater than 110° C. as measured at 0.45 MPa at 2% elongation with a 1 Hz frequency using a DMA. In one embodiment or in combination with any other embodiment, the foamable composition exhibits a heat deflection temperature of greater than 115° C. as measured at 0.45 MPa at 2% elongation with a 1 Hz frequency using a DMA.

In one embodiment or in combination with any other embodiment, the physical blowing agent comprises $CO_2$, $N_2$, unbranched or branched $(C_{2-6})$alkane, or any combination thereof. In one class of this embodiment, the physical blowing agent comprises $CO_2$. In one class of this embodiment, the physical blowing agent comprises $N_2$. In one class of this embodiment, the physical blowing agent comprises unbranched or branched $(C_{2-6})$alkane.

In one embodiment or in combination with any other embodiment, the physical blowing agent is present from 0.1 to 0.5 wt %. In one embodiment or in combination with any other embodiment, the physical blowing agent is present from 0.5 to 4 wt %. In one embodiment or in combination with any other embodiment, the physical blowing agent is present from 0.3 to 4 wt %. In one embodiment or in combination with any other embodiment, the physical blowing agent is present from 4 to 10 wt %.

In one embodiment or in combination with any other embodiment, the plasticizer comprises triacetin, triethyl citrate, or PEG400.

In one class of this embodiment, the plasticizer is present in a range of from 17 to 23 wt %. In one class of this embodiment, the plasticizer is present in a range of from 15 to 30 wt %.

In one class of this embodiment, the plasticizer comprises triacetin.

In one subclass of this class, the plasticizer is present in a range of from 17 to 23 wt %. In one subclass of this class, the plasticizer is present in a range of from 15 to 30 wt %.

In one class of this embodiment, the plasticizer comprises triethyl citrate. In one subclass of this class, the plasticizer is present in a range of from 17 to 23 wt %. In one subclass of this class, the plasticizer is present in a range of from 15 to 30 wt %.

In one class of this embodiment, the plasticizer comprises PEG400. In one subclass of this class, the plasticizer is present in a range of from 17 to 23 wt %. In one subclass of this class, the plasticizer is present in a range of from 15 to 30 wt %.

In one embodiment or in combination with any other embodiment, the nucleating agent comprises a magnesium silicate, a silicon dioxide, a magnesium oxide, or combinations thereof. In one class of this embodiment, the nucleating agent comprises a particulate composition with a median particle size less than 2 microns. In one class of this embodiment, the nucleating agent comprises a particulate composition with a median particle size less than 1.5 microns. In one class of this embodiment, the nucleating agent comprises a particulate composition with a median particle size less than 1.1 microns.

In one class of this embodiment, the nucleating agent comprises a magnesium silicate. In one subclass of this class, the nucleating agent comprises a particulate composition with a median particle size less than 2 microns. In one subclass of this class, the nucleating agent comprises a particulate composition with a median particle size less than 1.5 microns. In one subclass of this class, the nucleating agent comprises a particulate composition with a median particle size less than 1.1 microns.

In one class of this embodiment, the nucleating agent comprises a silicon dioxide. In one subclass of this class, the nucleating agent comprises a particulate composition with a median particle size less than 2 microns. In one subclass of this class, the nucleating agent comprises a particulate composition with a median particle size less than 1.5 microns. In one subclass of this class, the nucleating agent comprises a particulate composition with a median particle size less than 1.1 microns.

In one class of this embodiment, the nucleating agent comprises a magnesium oxide. In one subclass of this class, the nucleating agent comprises a particulate composition with a median particle size less than 2 microns. In one subclass of this class, the nucleating agent comprises a particulate composition with a median particle size less than 1.5 microns. In one subclass of this class, the nucleating agent comprises a particulate composition with a median particle size less than 1.1 microns.

In one embodiment or in combination with any other embodiment, the nucleating agent comprises a particulate composition with a median particle size less than 2 microns. In one embodiment, the nucleating agent comprises a particulate composition with a median particle size less than 1.5 microns. the nucleating agent comprises a particulate composition with a median particle size less than 1.1 microns.

In one embodiment or in combination with any other embodiment, the foamable composition further comprises a fiber. In one class of this embodiment, the fiber comprises hemp, bast, jute, flax, ramie, kenaf, sisal, bamboo, or wood cellulose fibers. In one subclass of this class, the fiber comprises hemp.

In one embodiment or in combination with any other embodiment, the foamable composition further comprises a photodegradation catalyst. In one class of this embodiment, the photodegradation catalyst is a titanium dioxide, or an iron oxide. In one subclass of this class, the photodegradation catalyst is a titanium dioxide. In one subclass of this class, the photodegradation catalyst is an iron oxide.

In one embodiment or in combination with any other embodiment, the foamable composition further comprises a pigment. In one class of this embodiment, the pigment is a titanium dioxide, a carbon black; or an iron oxide. In one subclass of this class, the pigment is a titanium dioxide. In one subclass of this class; the pigment is a carbon black. In one subclass of this class, the pigment is an iron oxide.

In one embodiment or in combination with any other embodiment, the foamable composition is biodegradable.

In one embodiment or in combination with any other embodiment, the foamable composition comprises two or more cellulose acetates having different degrees of substitution of acetyl.

In one embodiment or in combination with any other embodiment, the foamable composition further comprises a biodegradable polymer that is different than the cellulose acetate.

In one embodiment or in combination with any other embodiment, there is an article prepared from the any one of the previously described foamable compositions, wherein the article is a foam.

In one class of this embodiment, the article has a thickness of up to 3 mm.

In one class of this embodiment, the article has one or more skin layers.

In one class of this embodiment, the article is biodegradable.

In one class of this embodiment, the article has a density less than 0.9 g/cm$^3$, In one class of this embodiment, the article has a density of less than 0.8 g/cm$^3$. In one class of this embodiment, the article has a density of less than 0.7 g/cm$^3$. In one class of this embodiment, the article has a density of less than 0.6 g/cm$^3$. In one class of this embodiment, the article has a density of less than 0.5 g/cm$^3$. In one class of this embodiment, the article has a density of less than 0.4 g/cm$^3$. In one class of this embodiment, the article has a density of less than 0.3 g/cm$^3$. In one class of this embodiment, the article has a density of less than 0.2 g/cm$^3$. In one class of this embodiment, the article has a density of less than 0.1 g/cm$^3$. In one class of this embodiment, the article has a density of less than 0.05 g/cm$^3$. In one class of this embodiment, the article has a density in the range of from 0.2 to 0.9 g/cm$^3$.

In one class of this embodiment, the article is industrial compostable or home compostable. In one subclass of this class, the article is industrial compostable. In one sub-subclass of this subclass, the article has a thickness that is less than 6 mm. In one sub-subclass of this subclass, the article has a thickness that is less than 3 mm. In one sub-subclass of this subclass, the article has a thickness that is less than 1.1 mm. In one subclass of this class, the article is home compostable. In one sub-subclass of this subclass, the article has a thickness that is less than 6 mm. In one sub-subclass of this subclass, the article has a thickness that is less than 3 mm. In one sub-subclass of this subclass, the article has a thickness that is less than 1.1 mm. In one sub-subclass of this subclass, the article has a thickness that is less than 0.8 mm. In one sub-subclass of this subclass, the article has a thickness that is less than 0.6 mm. In one sub-subclass of this subclass, the article has a thickness that is less than 0.4 mm.

In one embodiment or in combination with any other embodiment, the article has a thickness that is less than 6 mm. In one embodiment or in combination with any other embodiment, the article has a thickness that is less than 3 mm. In one embodiment or in combination with any other embodiment, the article has a thickness that is less than 1.1 mm. In one embodiment or in combination with any other embodiment, the article has a thickness that is less than 0.8 mm. In one embodiment or in combination with any other embodiment, the article has a thickness that is less than 0.6 mm. In one embodiment or in combination with any other embodiment, the article has a thickness that is less than 0.4 mm.

The present application discloses a method for preparing a foamable composition comprising: (a) providing a non-foamable composition comprising (1) a cellulose acetate having a degree of substitution of acetyl ($DS_{Ac}$) between 2.2 to 2.6, (2) 5 to 40 wt % of a plasticizer, and (3) 0.1 to 3 wt % of a nucleating agent; (b) melting the nonfoamable composition in an extruder to form a melt of the nonfoamable composition; and (b) injecting a physical blowing agent into the melt of the nonfoamable composition to prepare a melted foamable composition.

In one embodiment or in combination with any other embodiment, the physical blowing agent comprises $CO_2$, $N_2$ or an unbranched or branched ($C_{2-6}$)alkane.

In one embodiment or in combination with any other embodiment, the article exhibits greater than 30% disintegration after 12 weeks according to Disintegration Test Protocol, as described in the specification or in the alternative according to ISO 16929 (2013). In one embodiment or in combination with any other embodiment, the article exhibits greater than 50% disintegration after 12 weeks according to Disintegration Test Protocol, as described in the specification or in the alternative according to ISO 16929 (2013). In one embodiment or in combination with any other embodiment, the article exhibits greater than 70% disintegration after 12 weeks according to Disintegration Test Protocol, as described in the specification or in the alternative according to ISO 16929 (2013), In one embodiment or in combination with any other embodiment, the article exhibits greater than 80% disintegration after 12 weeks according to Disintegration Test Protocol, as described in the specification or in the alternative according to ISO 16929 (2013). In one embodiment or in combination with any other embodiment, the article exhibits greater than 90% disintegration after 12 weeks according to Disintegration Test Protocol, as described in the specification or in the alternative according to ISO 16929 (2013). In one embodiment or in combination with any other embodiment, the article exhibits greater than 95% disintegration after 12 weeks according to Disintegration Test Protocol, as described in the specification or in the alternative according to ISO 16929 (2013).

Specific Embodiments

Embodiment 1. A foamable composition, comprising: (1) a cellulose acetate having a degree of substitution of acetyl ($DS_{Ac}$) between 2.2 to 2.6; (2) 5 to 40 wt % of a plasticizer; (3) 0.1 to 3 wt % of a nucleating agent; and (4) 0.1 to 3 wt % a chemical blowing composition, comprises: (i) 25 to 75 wt % of a blowing agent, and (ii) 25 to 75 wt % of a carder polymer having a melting point that is no more than 150° C., wherein the proportions of the blowing agent and the carrier polymer are based on the total weight of the chemical blowing composition, wherein the proportions of the cellulose acetate, plasticizer, nucleating agent and chemical blowing composition are based on the total weight of the foamable composition.

Embodiment 2. The foamable composition of any one of Embodiment 1, wherein the blowing agent comprises sodium bicarbonate, citric acid or combination thereof.

Embodiment 3. The foamable composition of any one of Embodiments 1-2, wherein the carrier polymer comprises a polybutylene succinate, a polycaprolactone, or combinations thereof.

Embodiment 4. A foamable composition comprising: (1) a cellulose acetate having a degree of substitution of acetyl ($DS_{Ac}$) between 2.2 to 2.6; (2) 5 to 40 wt % of a plasticizer; (3) 0.1 to 3 wt % of a nucleating agent; and (4) 0.1 to 15 wt % of a physical blowing agent, wherein the proportions of the cellulose acetate, plasticizer, nucleating agent and physical blowing agent are based on the total weight of the foamable composition.

Embodiment 5. A foamable composition comprising: (1) a cellulose acetate having a degree of substitution of acetyl ($DS_{Ac}$) between 2.2 to 2.6; (2) 5 to 40 wt % of a plasticizer; (3) 0.1 to 3 wt % of a nucleating agent; and (4) 1 to 15 wt % of a physical blowing agent, wherein the proportions of the cellulose acetate, plasticizer, nucleating agent and physical blowing agent are based on the total weight of the foamable composition.

Embodiment 6. The foamable composition of any one of Embodiments 4 or 5, wherein the physical blowing agent comprises $CO_2$, $N_2$, unbranched or branched ($C_{2-6}$)alkane, or any combination thereof.

Embodiment 7. The foamable composition of any one of Embodiments 1-6, wherein the plasticizer comprises triacetin, triethyl citrate, or PEG400.

Embodiment 8. The foamable composition of any one of Embodiments 1-7, wherein the plasticizer is present from 17 to 23 wt %.

Embodiment 9. The foamable composition of any one of Embodiments 1-8, wherein the nucleating agent comprises a particulate composition with a median particle size less than 2 microns.

Embodiment 10. The foamable composition of any one of Embodiments 1-9, wherein the nucleating agent comprises a magnesium silicate, a silicon dioxide, a magnesium oxide, or combinations thereof.

Embodiment 11. The foamable composition of any one of Embodiment 1-10, wherein the foamable composition further comprises a fiber.

Embodiment 12. The foamable composition of Embodiment 11, wherein the fiber is biodegradable.

Embodiment 13. The foamable composition of any one of Embodiments 11-12, wherein the fiber comprises hemp, bast, jute, flax, ramie, kenaf, sisal, bamboo, or wood cellulose fibers.

Embodiment 14, The foamable composition of any one of Embodiment 1-13, wherein the foamable composition further comprises a photodegradation catalyst.

Embodiment 15. The foamable composition of Embodiment 14, wherein the photodegradation catalyst is a titanium dioxide, or an iron oxide.

Embodiment 16. The foamable composition of any one of Embodiment 1-15, wherein the foamable composition further comprises a pigment.

Embodiment 17. The foamable composition of Embodiment 16, wherein the pigment is a titanium dioxide, carbon black, or an iron oxide.

Embodiment 18. The foamable composition of any one of Embodiment 1-17, wherein the foamable composition is biodegradable.

Embodiment 19. The foamable composition of any one of Embodiment 1-18, wherein the foamable composition comprises two or more cellulose acetates having different degrees of substitution of acetyl.

Embodiment 20. The foamable composition of any one of Embodiment 1-19, wherein the foamable composition further comprises a biodegradable polymer that is different than the cellulose acetate.

Embodiment 22. The composition of any one of Embodiments 1-20, wherein when the composition is formed into a film having a thickness of 0.38 mm, the film exhibits greater than 5% disintegration after 6 weeks and greater than 90% disintegration after 12 weeks according to Disintegration Test Protocol, as described in the specification.

Embodiment 23. The composition of any one of Embodiments 1-20, wherein when the composition is formed into a film having a thickness of 0.38 mm, the film exhibits greater than 10% disintegration after 6 weeks and greater than 90% disintegration after 12 weeks according to Disintegration Test Protocol, as described in the specification.

Embodiment 24. The composition of any one of Embodiments 1-20, wherein when the composition is formed into a film having a thickness of 0.76 mm, the film exhibits greater than 90% disintegration after 12 weeks according to Disintegration Test Protocol, as described in the specification.

Embodiment 25. An article prepared from the foamable composition of any one of Embodiments 1-24, wherein the article is a foam.

Embodiment 26. The article of Embodiment 25, wherein the article has a thickness of up to 6 mm.

Embodiment 27. The article of anyone of Embodiments 25-26, wherein the article has one or more skin layers.

Embodiment 28. The article of any one of Embodiments 25-27, wherein the article is biodegradable.

Embodiment 29. The article of any one of Embodiments 25-28, wherein the article has a density less than 0.9 g/cm$^3$.

Embodiment 30. The article of any one of Embodiments 25-29, wherein the article is industrial compostable or home compostable.

Embodiment 31, The article of Embodiment 30, wherein the thickness is less than 3 mm.

Embodiment 32. The article of any one of Embodiments 25-31, wherein the article exhibits greater than 90% disintegration after 12 weeks according to disintegration test protocol for films, as described in the specification.

EXAMPLES

Abbreviations

BHT is butylated hydroxytoluene or Tenox BHT (Eastman); bioCBA is biodegradable chemical blowing agent; CA is cellulose acetate; CA398-30 is Eastman cellulose acetate CA398-30; CA398-10 is Eastman cellulose acetate CA398-10; CBA is chemical blowing agent; CDA is cellulose diacetate; CAPA 6500 is polycaprolactone (Ingevity); OE41972 is Eastman cellulose acetate Cellulose Ester 41972; DLTDP is dilauryl thiodipropionate (Sigma Aldrich); DMA or DMTA is dynamic mechanical analysis; DS is degree of substitution per anhydroglucose unit of a cellulose ester; EOB is elongation at break; EPSO is epoxidized soybean oil (Vikoflex 7170, Arkema); FZ 73S is Foamazol 73s (Bergen International); FZ 95 is Foamazol 95 (Bergen International); h or hr is hour(s); HDT is heat deflection temperature; HK40B is Hydrocerol HK40B (Clariant); PHB (6)Hx poly(3-hydroxybutyrate-co-6 mol %-3-hydroxyhexanoate) having an average Mw or about 770,000 (measured using GPC and PS standards with methylene chloride solvent); Pz is plasticizer; TA is triacetin; TEC is triethyl citrate; ° C. is degree(s) Celsius; wt % is weight percent; PEG400 is polyethylene glycol with an average molecular weight of 400 Daltons, kWh kg is kilowatt hour per kilogram; L is liters; oz is ounce; PBA is physical blowing agent; PBS is polybutylene succinate; PCL is polycaprolactone; PS is polystyrene; rpm is revolutions per minute; TGA is thermal gravimetric analysis; MW is molecular weight.

Test Materials and Protocols: Cellulose Diacetate Compositions

Starting CDA materials were obtained from Eastman Chemical Company. The materials included commercially available CDA having a DS of 2.5 and Mn of about 50,000 and about 40,000 (CA398-30 and CA398-10) and commercially manufactured CDA having a DS of 2.2. CDA compositions with Pz were prepared. The plasticizer used in the examples was TA. TA pre-plasticized compositions were also compounded into additional compositions with fillers or polymeric additives. Cellulose acetate compositions were made with a polymeric additive that was polyethylene glycol having an average molar mass of about 400 g/mol ("PEG-400") and no TA plasticizer. Plasticized cellulose acetate resin was prepared by feeding cellulose diacetate to a twin screw co-rotating extruder using loss in weight feeders for the solids and liquid feeds. The solids were fed into the feed throat of the extruder and liquids were injected into the first heated barrel zone. The materials were compounded using an increasing temperature profile from 70° C. in the 1st heated zone to 230° C. at the die. The materials were processed at conditions sufficient to provide a relatively homogeneous resin mixture. The resulting resin was a pre-plasticized cellulose acetate resin with either 15, 17 or 30 wt % TA as plasticizer. The cellulose acetate composition with PEG400 was made in a similar manner.

In the case of compounded CDA compositions, the (TA) pre-plasticized cellulose acetate resin with 15, 17 or 30 wt % TA as plasticizer (base resin) was compounded with filler material or polymeric additive. The compounding was performed on a 26 mm twin screw extruder with side feeders. The base resin was fed into a barrel on the extruder through a loss in weight feeder system. Filler materials or polymeric additives were added through a side feeder with a loss in weight feeder system. The zone 1 temperature was set at 150° C. as well as all subsequent zones plus the die was set at 180° C. Specific energy input (SEI) varied between 0.116 kWh/kg and 0.158 kWh/kg for these compounds. Melt temperatures were between 177° C. and 181° C. (measured in the die). Atmospheric venting was performed after the first kneading section and prior to the pumping section to vent steam from the undried base polymer and water associated with the filler materials. The final product composition was produced by passing through a dye to produce strands that were cut into pellets.

Extruded Films

A 1.5 inch Killion single screw extruder equipped with Maddock mixer screw was utilized to produce films. Cellulose acetate composition pellets were loaded into the hopper and material passed into the barrel where the Maddock screw transferred the material toward the die. The barrel (housing the screw) was heated in three zones so that the pellets would melt as they passed over the screw along a very narrow clearance allowing for a high shear and high degree of dispersive mixing. It was observed that a homogeneous polymer mixture was formed as it approached the die and the mixture was forced through the die by the screw where extrusion occurs. The extrusion formed a flat molten film as the film exited the die and the film solidified on temperature controlled polished chrome rolls (the roll stack).

Post-extrusion film samples were removed intermittently to determine film thickness. When the extruder was producing the proper film thickness, the film was attached to a receiving roller and the film was carefully wound until the final roll was complete.

Disintegration Test Protocol for Films

A test method used for disintegration was based on ISO 16929 Plastics—Determination of the Degree of Disintegration of Plastics Materials under Defined Composting Conditions in a Pilot-Scale Test (2013). A pilot-scale aerobic composting test was used to simulate as closely as possible a real and complete composting process in composting bins of 200 L. The test materials (films) were put into slide frames that exposed approximately 8.05 $cm^2$ of test material on both sides of the film. These slide frames were then mixed with biowaste and composted in two 200-liter composting bins. The biowaste consisted of Vegetable, Garden and Fruit waste (VGF) to which 11% extra structural material was added in order to obtain optimal composting conditions. Consistent with full-scale composting, inoculation and temperature increase happened spontaneously. The test was considered valid only if the maximum temperature during composting was above 60° C. and below 75° C., and if the daily temperature remained above 40° C. during at least 4 weeks. The composting process was directed through air flow and moisture content. The temperature and exhaust gas composition were regularly monitored. The composting process was continued until fully stabilized compost was obtained (3 months). During composting, the contents of the vessels were manually turned, at which time test item were retrieved and visually evaluated.

Solvent-Casting of Films

CA398-30 was the resin for all tests (DS=2.52; mp 230-2500, Tg 1890). Solutions were made containing 12% CA398-30 in acetone. Additives were included in the solution as indicated. Some mixtures were heated to 500 to promote dissolution and mixing. Thin films (~3 mil), were drawn down on a clean glass plate using a film applicator (BYK 5351; 2" square frame, 5-50 mils). Thicker films (5 to 40 mil) were cast from acetone into flat-bottom aluminum dishes, and solvent evaporation was controlled over 16 to 24 h by covering the pans. Film thickness was measured with a digital micrometer (Mitutoyo Digimatic Micrometer, MDC-1" PX) with 0.0.05 mil resolution.

Glass Transition Temperature

Glass transition temperature (Tg) was estimated by both Differential Scanning calorimetry (DSC) and by DMA. DMA of the films consisted of a normal temperature sweep at one frequency controlling oscillating strain, to collect information about both room temperature differences and Tg differences. For DMA, film samples were run at 3° C. per min under 0.1% strain at 1 Hz and the Tg range was estimated from the E' onset and the peak of the Tan(Delta) curve.

Tg (DSC) of 10 Mil Films with PEG MW 200 to 2000

PEG with MW ranging from 200 to 8,000 was added at 17.0 wt % to a CA398-30 dope (12 wt % CA398-30 in acetone) and incorporated by heating at up to 50° C. Films were cast with a 10 mil dry thickness. Tg of the CA398-30/PEG blends was estimated by DSC $2^{nd}$ heat, and the results are summarized in Table 1. When the PEG MW was 6,000 or greater, incompatibility in the films was observed as defects in the films. When the PEG MW was 2,000 or greater, no Tg was detected in the $2^{nd}$ heat during DSC. Instead, an endotherm was detected at a temperature close to the melting point of the PEG, a sign of immiscibility of the blend. A single Tg was detected in CA/PEG blends when the PEG MW was 600 or lower.

TABLE 1

DSC of CA/PEG blends with PEG (17.0 wt %).

| Plasticizer @ 17.0 wt % | Appears | Tg (DSC, $2^{nd}$ heat) | Other |
|---|---|---|---|
| PEG200 | Clear | 108.27 | |
| PEG300 | Clear | 107.54 | |
| PEG400 | Clear | 116.84 | |
| PEG600 | Clear | 108.31 | |
| PEG2000 | Clear | no Tg | 52.72 (large endotherm) |
| PEG3350 | Clear | no Tg | 58.07 (large endotherm) |
| PEG4600 | Clear | no Tg | 57.87 (large endotherm) |
| PEG6000 | Minor defects | no Tg | 59.46 (large endotherm) |
| PEG8000 | Major defects | no Tg | 62.26 (large endotherm) |

Plasticization Efficiency as Estimated by DMA

Measuring Tg of thin films plasticized with PEG and PEG derivatives is not straightforward, and a clear glass transition temperature of cellulosic materials is sometimes difficult to observe by DSC. When a more sensitive technique is needed, ©MTA or DMA is an option.

Table 2 and 3 provide Tg values using the DMA method for CA398-30) films plasticized at 23 wt % and 17 wt %, respectively. The Tan(delta) was used as an estimate of the Tg values for the films. At 23 wt % plasticizer loading (Table 2), PEG600, MPEG165, MPEG165, MPEG550, and MPEG750 exhibited Tg values of greater than 160° C. as measured by DMA. On the other hand, PEG200, PEG300, PEG400, MPEG350, MEPG450 exhibited Tg values of from 113° C. to 120° C., indicating greater plasticization efficiency.

TABLE 2

| DMA of CA398-30 films with 23 wt % plasticizer. | |
|---|---|
| CA398-30 with PZ (23 wt %) 3-4 mil thick | Tan(delta) $T_g$ (° C.) |
| N/A | 220.4 |
| TA | 153.0 |
| PEG200 | 115.3 |
| PEG300 | 119.7 |
| PEG400 | 117.3 |
| PEG600 | 164.4 |
| MPEG165 | 204.0 |
| MPEG350 | 113.4 |
| MPEG450 | 118.3 |
| MPEG550 | 166.1 |
| MPEG750 | 169.2 |

For plasticizer loading at 17 wt % (Table 3), PEG400, MPEG350 and MPEG550 exhibited a Tg range of from 127° C. to 132° C. However, PEG600 exhibited a Tg of 195.6° C., which is similar to unplasticized CA398-30.

TABLE 3

| DMA of CA398-30 films with plasticizer (17 wt %). | |
|---|---|
| CA398-30 with PZ (17 wt %) 3-4 mil thick | Tan(delta) $T_g$ (° C.) |
| N/A | 220.4 |
| TA | 149.5 |
| PEG 400 | 131.6 |
| PEG 600 | 195.5 |
| MPEG 350 | 131.5 |
| MPEG 550 | 127.8 |

Relative Thermal Stability/Volatility of PEG and Other Plasticizers in CA398-30 Films The low MW of plasticizers are susceptible to volatilization during thermal processing, either during compounding, extrusion or thermoforming. Isothermal volatility was tested on different film formulations. CA398-30: DS=2.5; nip 230-250, Tg 1890 (DSC). Thin films (~3 mil) were cast onto glass plates from a 12 wt % solution of CA398-30 and plasticizer in acetone. The solvent was evaporated, and the films equilibrated under lab conditions (20-23 C, 25-30% RH). Films with 23.0 wt % PZ (1-inch squares, equilibrated to lab ambient conditions, 20-23° C. and ~25% RH), were accurately weighed before and after being heated to 120° C. for 7 min to 127 min to monitor weight loss. The results in Table 4 show that PEG200 is the most volatile plasticizer in the 5 mil films, followed by TA) and TEC. Weight loss of films plasticized with PEG400, PEG600, Polysorbate 20 (Tween 20) was not different from unplasticized CA398-30.

TABLE 4

| Weight loss upon heating of CDA films plasticized with PZ (23 wt %) to 120° C.. | | | |
|---|---|---|---|
| | Time | | |
| Plasticizer | Wt % Loss @7 min | Wt % Loss @67 min | Wt % Loss @127 min |
| PEG200 | 3.3 | 15.0 | 15.6 |
| PEG400 | 0.2 | 1.7 | 2.8 |
| PEG600 | 0.5 | 1.6 | 3.5 |
| TA | 4.7 | 11.8 | 12.9 |
| No Pz | 0.9 | 2.4 | 1.2 |

Stress Whitening after Biaxial Stretching

The films of Ex 16 were subjected to stretching to mimic thermoforming. To understand the sheet temperature effect, two oven temperatures are chosen at 165° C. and 185° C. The heating time is fixed at 40 seconds before stretching. To mimic the areal draw ratio of a 12 oz clam shell, an equivalent biaxial draw ratio 1.5×1.5 is used. For a 12 oz drinking cup, an equivalent biaxial draw ratio 2×2 is used. Two strain rates are also selected. One is at 50%/s which is about the same strain rate in vacuum forming @ 25 in Hg. The other is 500%/s which approximates the high speed stretching from a plug. Since stress whitening is the main focus in this example, the key response is thus haze in the sheet which is proportional to degree of stress whitening.

The formation of stress whitening was in thermoforming CDA sheet into clam shell (hinged container) or cup, To mimic vast packaging containers in different shapes and sizes, an equivalent biaxial draw ratio is calculated by using the areal draw ratio of the container. Table 5 shows two examples, One is for a 12 oz drink cup which has an areal draw ratio of 4.45 whose approximate biaxial draw ratio is about 2×2. The other is a 12 oz clam shell which has an areal draw ratio of 1.93 whose approximate biaxial ratio is about 1.5×1.5. The areal draw ratio is defined by the total surface area of the formed container divided by the original sheet area before forming

TABLE 5

| Biaxial film stretching for the simulation of thermoforming. | | |
|---|---|---|
| | Areal Draw Ratio | Biaxial Draw Ratio |
| 12 oz cup | 4.45 | ~2 × 2 |
| 12 oz Clam Shell | 1.93 | ~1.5 × 1.5 |

To explore the effect of each variable on the stress whitening in biaxially stretched CDA sheets, Table 6 is the experimental matrix. The haze of each sample will be measured by changing the thickness, draw ratio, stretching temperature, and strain rate.

TABLE 6

| Experimental matrix | | | | | | | | |
|---|---|---|---|---|---|---|---|---|
| Variables | Ex 13 | | Ex 14 | | Ex 15 | | Ex 16 | |
| PZ, 20 wt % | PEG 400 | | PEG 400 | | TA | | TA | |
| Thickness, mil | 15 | | 30 | | 15 | | 30 | |
| Draw Ratio, MD × TD | 1.5 × 1.5 | 2 × 2 | 1.5 × 1.5 | 2 × 2 | 1.5 × 1.5 | 2 × 2 | 1.5 × 1.5 | 2 × 2 |
| Temp, ° C. | 165 | 185 | 165 | 185 | 165 | 185 | 165 | 185 |
| Strain Rate, %/s | 50% | 500% | 50%, | 500% | 50% | 500% | 50% | 500% |

Haze of 15 Mil Samples after Stretching

At a lower draw ratio 1.5×1.5, 15 mil Ex 13 samples show little haze under various stretching conditions as shown in Table T Ex 15 (15 mil) samples on the other hand develop some haze at the same stretching conditions especially at 165° C. Table 7 summarizes the results from biaxial stretching of 15 mil thick samples, Ex 13 demonstrates little haze formation even it is subjected to a higher draw ratio, strain rate and lower temperature while obvious haze is observed for Ex 15 at the same combined stretching conditions.

TABLE 7

Haze results of 15 mil samples stretched at various conditions.

| 15 mil | Stretching Conditions | Haze, % | Stretching Conditions | Haze, % |
|---|---|---|---|---|
| Ex 13 | 1.5 × 1.5, 165° C., 50% | 1.44 | 2 × 2, 165° C., 50% | 1.31 |
| | 1.5 × 1.5, 165° C., 500% | 1.22 | 2 × 2, 165° C., 500% | 1.2 |
| | 1.5 × 1.5, 185° C., 50% | 1.33 | 2 × 2, 185° C., 50% | 1.03 |
| | 1.5 × 1.5, 185° C., 500% | 0.89 | 2 × 2, 185° C., 500% | 1.02 |
| EX 15 | 1.5 × 1.5, 165° C., 50% | 11 | 2 × 2, 165° C., 50% | 20.2 |
| | 1.5 × 1.5, 165° C., 500% | 7.2 | 2 × 2, 165° C., 500% | 19.1 |
| | 1.5 × 1.5, 185° C., 50% | 4.04 | 2 × 2, 185° C., 50% | 3.97 |
| | 1.5 × 1.5, 185° C., 500% | 4.79 | 2 × 2, 185° C., 500% | 6.05 |

Table 8 summarizes the results for 30 mil thick samples, Ex 14 demonstrates little haze formation even though it is subjected to a higher draw ratio, strain rate and lower temperature while significant haze is observed for Ex 16 at the same combined stretching conditions.

TABLE 8

Haze results of 30 mil samples stretched at various conditions.

| 30 mil | Stretching Condition | Haze, % | Stretching Condition | Haze, % |
|---|---|---|---|---|
| Ex 14 | 1.5 × 1.5, 165° C., 50% | 2.63 | 2 × 2, 165° C., 50% | 2.49 |
| | 1.5 × 1.5, 165° C., 500% | 2.21 | 2 × 2, 165° C., 500% | 3.43 |
| | 1.5 × 1.5, 185° C., 50% | 1.9 | 2 × 2, 185° C., 50% | 2.62 |
| | 1.5 × 1.5, 185° C., 500% | 2.63 | 2 × 2, 185° C., 500% | 3.36 |
| Ex 16 | 1.5 × 1.5, 165° C., 50% | 16.9 | 2 × 2, 165° C., 50% | 58.1 |
| | 1.5 × 1.5, 165° C., 500% | 8.3 | 2 × 2, 165° C., 500% | 47 |
| | 1.5 × 1.5, 185° C., 50% | 14.6 | 2 × 2, 185° C., 50% | 7.17 |
| | 1.5 × 1.5, 185° C., 500% | 11.8 | 2 × 2, 185° C., 500% | 15.5 |

In films Ex 15 and Ex 16, due to stress whitening issue, only shallow drawn articles can be vacuum formed using this formulation.

Gel Count

Gel Count Protocol

The gel count was determined by adapting ASTM D7310-11. The film samples were imaged using an Allied Vision Technologies GT2750C Ethernet based camera. The area being analyzed is 5 cm×5 cm=25 $cm^2$, taking 6 images with a total area imaged of 150 $cm^2$. The camera is a color camera with a 2750×2200 1 inch pixel sensor. The camera utilizes the default settings except the exposure time is set to 400 microseconds. The lens used in the system is an Opto Engineering TC23080 bi-telecentric lens. The working distance of the lens is 2267 mm. This generates a field of view that is 76.5 mm×64.0 mm. The light used in the setup is an Opto Engineering LTCLHP080-G collimated light. The light was positioned 150 mm away from the sample. The light and lens are setup in transmission mode so that the film sample rests between the light and lens. The transmission mode layout coupled to telecentric optics provides unique advantages over other lighting geometry/lens combinations. The combination of transmission mode coupled to telecentric optics causes translucent gels present in a translucent film to appear as dark particles on the image sensor. The appearance of gels as dark particles on a translucent background enables easy detection, counting, and metrology of gels.

Images from the camera were acquired using National Instruments Measurement and Automation Explorer software. The images were processed using an internally developed program written in the LabVIEW programming language. In general, the image processing program isolates individual gels in the film. The first step the program performs is a color plane extraction. When an image is collected with a color camera there are several images created in different planes. The color plane extracted for this method was the HSI intensity plane because this color plane gave the best contrast between the background and defects of interest. The next step performed in the image processing routine is calibration of the image. Calibration of the image is used to convert the pixels into real world units. An imaging standard is used to perform this calibration. The saved calibration is then applied in this step to all subsequent images. The image is then threshold using a local background corrected algorithm with a local area of 32×32 pixels. This automated thresholding routine performs a background correction to eliminate non-uniform lighting effects. The interclass variance thresholding algorithm is then applied to isolate dark particles, hi the interclass variance method for thresholding the interclass variance is measured at every possible pixel intensity. The threshold is set at a pixel intensity such that the interclass variance is maximized. The algorithm assumes that the pixel intensities represent a bimodal distribution with 2 classes. The image is a binary image at this point in the processing routine. The particles in the image are given a value of 1 and the background is given a value of 0. An opening function is applied to the particles. The opening function first erodes particles and then dilates the remaining particles. The larger particles remain, but small particles are eliminated. This step is done to eliminate sensor noise and to disconnect neighboring particles that may be touching. The next step eliminates particles that are touching the boarder of the image because these particles cannot be accurate measured. Once the boarder particles are eliminated the area of all gel particles is summed. The area imaged coupled to the area of the gels can be used to calculate the total particle/gel area of the film sample.

Extruded Films, Ex 17-20

CA398-30 was compounded with either PEG400 or PEG600 at the desired weight percentage and subsequently formed into pellets. A twin screw extruder was used to first prepare compounded pellets with the extruder having the conditions as shown in Table 9. Before using the pellets for extruding the films, the pellets were dried at 140° C. for 4 h. The dried compounded pellets were then used to extrude the pellets using an extruder having the following conditions shown in Table 10.

TABLE 9

Extruder Conditions for Preparing Compounded Pellets.

| Barrel Temperature | ° C. |
|---|---|
| Zone 1 | 90 |
| Zone 2 | 160 |
| Zone 3 | 200 |
| Zone 4 | 200 |
| Zone 5 | 210 |

TABLE 9-continued

| Extruder Conditions for Preparing Compounded Pellets. | |
|---|---|
| Barrel Temperature | ° C. |
| Zone 6 | 220 |
| Zone 7 | 220 |
| Zone 8 | 220 |
| Zone 9 | 220 |
| Die | 225 |

TABLE 10

| Extruder Conditions for preparing films used to conduct gel count study. | |
|---|---|
| Extrusion condition | ° C. |
| zone 1 | 218 |
| zone 2 | 227 |
| zone 3 | 227 |
| zone 4 | 227 |
| adaptor | 227 |
| die | 238 |
| chill roll | 93 |

Ex 17: Film (80 wt % CA398-30, 20 wt % PEG400, 30 mil)

Ex 18: Film (80 wt % CA398-30, 20 wt % PEG400, 15 mil)

Ex 19: Film (80 wt % CA398-30, 20 wt % PEG600, 30 mil)

Ex 20: Film (80 wt % CA398-30, 20 wt % PEG600, 15 mil)

TABLE 11

Gel count distribution for 15 mil and 30 mil (PEG400/PEG600)

| Ex # | Total Particle Area [ppm] (% area) | Gel Count Distribution 90-250 µm (ppm) | 250-400 µm (ppm) | 400-550 µm (ppm) | 550-700 µm (ppm) | 700-850 µm (ppm) | 850-1000 µm ($ppm^2$) | 1000-1500 µm ($ppm^2$) | >1500 µm ($ppm^2$) |
|---|---|---|---|---|---|---|---|---|---|
| 17 | 22463 (2.2%) | 431 | 460 | 433 | 222 | 440 | 973 | 5640 | 13863 |
| 18 | 1418 (0.14%) | 171 | 193 | 146 | 137 | 164 | 42 | 371 | 195 |
| 19 | 298592 (29.9%) | 886 | 2065 | 3663 | 6827 | 8897 | 11317 | 41420 | 223518 |
| 20 | 162812 (16.2%) | 606 | 999 | 1326 | 2201 | 4229 | 6431 | 21420 | 125600 |

Examples 1 and 2—Disintegration of Filled and Unfilled Samples

Pilot-scale aerobic composting tests were conducted (as described above). In the tests, the film sample was mixed with fresh organic pre-treated municipal solid waste (bio-waste) and introduced to an insulated composting bin, at which time composting spontaneously began. The film samples tested included: 15 mil thick extruded films of cellulose diacetate plasticized with 15 wt % TA, 1 wt % EPSO, and no filler (Ex 1); and 15 mil thick extruded films of cellulose diacetate plasticized with 15 wt % TA and compounded with 1 wt % EPSO and 15 wt % calcium carbonate (Omyacarb UF-FL $CaCO_3$, surface treated and having a particle size of 0.70 microns) (Ex 2). The films were prepared as discussed above. The samples were observed after 1, 2, 3, 4, 6, 8, 10 and 12 weeks of composting. The disintigration results for Ex 1 and 2 are summarized in Table 12.

The films made from compositions containing 15 wt % calcium carbonate had faster disintegration. Although not shown, a similar effect was observed for films with 30 wt % TA, where films with 30 wt % TA disintegrated faster than otherwise similar films with 15 wt % TA.

Examples 3 and 4—Disintegration as a Function of Acetyl Level

Film samples were tested as follows: 10 mil thick extruded films of cellulose diacetate having an acetyl degree of substitution (DS) of 2.5 and Mn of 50,000 plasticized with 15 wt % TA, 1 wt % EPSO, and no filler (Ex 3); and 10 mil thick extruded films of cellulose diacetate having an acetyl degree of substitution (DS) of 2.2 plasticized with 15 wt % TA, 1 wt % EPSO, and no filler (Ex 4). The films were prepared as discussed above. The samples were observed after 1, 2, 3, 4, 6, 8, 10 and 12 weeks of composting. The results of Ex 3 and 4 are summarized in Table 12.

A review of the results reveals that the films with a lower acetyl level CDA will disintegrate faster than a similar film with a higher acetyl content CDA.

Ex 5—Disintegration as a Function of Molecular Weight

Film samples were tested as follows: 10 mil thick extruded films of cellulose diacetate having a number average molecular weight (Mn) of 40,000 (measured by GPC as described herein) plasticized with 15 wt % TA, 1 wt % EPSO, and no filler. The films were prepared as discussed above. The samples were observed after 1, 2, 3, 4, 6, 8, 10 and 12 weeks of composting. The results of Ex 5 are also summarized in Table 12.

The results reveal that the films with a lower molecular weight CDA will disintegrate faster than a similar film with a higher molecular weight CDA.

Examples 6 to 7—Disintegration of Compounded CDA Compositions with Plasticizer and Polymeric Additives The film samples tested included: 20 mil thick extruded films of cellulose diacetate plasticized with 17 wt % TA and compounded with 1 wt % EPSO and 20 wt % PHB(6)Hx (Ex 6); and 20 mil thick extruded films of cellulose diacetate plasticized with 17 wt % TA and compounded with 1 wt % EPSO, 20 wt % PHB(6)Hx and 10 wt % CAPA 6500 (Ex 7). The results are summarized in Table 12.

Examples 8-11—Disintegration of CDA Compositions with PEG Additive

The film samples tested included: 15 and 30 mil thick extruded films of cellulose diacetate compounded with 1 wt % EPSO and 10, 15, or 20 wt % PEG-400. The results are summarized in Table 12.

Example 12—Disintegration of CDA Compositions with Foaming Agent

The film samples tested included: 20 mil thick extruded films of cellulose diacetate plasticized with 20 wt % TA and compounded with 1 wt % talc and 1 wt % EPSO by compounding the components in a manner similar to methods discussed above. The films were produced using a single screw extruder, as discussed above, except 1 wt % chemical foaming agent (FZ 73s) was added at the feed hopper to produce a foamed film (Ex 12). Ex 12 foam sample, at a thickness of 20 mil, passed in the qualitative composting test after 10 weeks. The results are summarized in Table 12.

TABLE 12

Summary of Disintegration Results (Industrial Composting)

| Ex | CDA | | TA | Polymer | Filler | Film or Foam | % Disintegration | |
|---|---|---|---|---|---|---|---|---|
| # | DS | Mn | wt % | (wt %) | (wt %) | (mil) | 6 wks | 12 wks |
| 1 | 2.5 | 50k | 15 | N/A | N/A | 15 | 0 | 10 |
| 2 | 2.5 | 50k | 15 | N/A | $CaCO_3$ (15) | 10 | >5 | >90 |
| 3 | 2.5 | 50k | 15 | N/A | N/A | 10 | >5 | >80 |
| 4 | 2.2 | 50k | 15 | N/A | N/A | 10 | 30 | >90 |
| 5 | 2.5 | 40k | 15 | N/A | N/A | 10 | >90 | >90 |
| 6 | 2.5 | 50k | 17 | PHB(6)Hx (20) | N/A | 20 | 5 | >90 |
| 7 | 2.5 | 50k | 17 | PHB(6)Hx (20)/CAPA 6500(10) | N/A | 20 | >90 | >90 |
| 8 | 2.5 | 50k | 0 | PEG400 (15) | N/A | 15 | <20 | >90 |
| 9 | 2.5 | 50k | 0 | PEG400 (15) | N/A | 30 | <20 | <90 |
| 10 | 2.5 | 50k | 0 | PEG400 (20) | N/A | 15 | >90 | >90 |
| 11 | 2.5 | 50k | 0 | PEG400 (20) | N/A | 30 | 0 | >90 |
| 12 | 2.5 | 50k | 20 | N/A | Talc (1) | 20 | 30 | >90 |
| 33 | 2.5 | 50k | 20 | N/A | N/A | 30 | 25 | >90 |
| 34 | 2.5 | 50k | 20 | N/A | 10% Hemp | 32 | 40 | >95 |

OWS Home Composting

Ex 12 @ 20 mil foam sample disintegrated well in 20 weeks under OWS home composting conditions. Ex 12 completed disappeared in 26 weeks under home composting conditions (Table 13).

TABLE 13

Disintegration of Ex 12 Under Home Composting Conditions.

| Ex | CDA | | TA | Polymer | Filler | Foam | % Disintegration | |
|---|---|---|---|---|---|---|---|---|
| # | DS | Mn | wt % | (wt %) | (wt %) | (mil) | 12 wks | 26 wks |
| 12 | 2.5 | 50k | 20 | N/A | Talc (1) | 20 | 0 | >90 |

Disintegration Vs Biodegradation

In general, degradation is followed by the determination of parameters such as DOC (dissolved organic carbon), $CO_2$ production and oxygen uptake. There are three main methods for testing the biodegradation of a material: the Sturm method, respirometry method, and the radio-labeled $^{14}C$ atom test method. The Sturm method precisely measures carbon dioxide production through a change in pressure. The respirometry test precisely measures the oxygen consumption over 60 days. Finally, the radio-labeled 14C atom test determines $^{14}C$ conversion to $^{14}CO_2$. An three methods can be used under aquatic or composting conditions if the right equipment is used.

Freshwater Modified Sturm Test (OECD 301B) The amount of carbon dioxide ($CO_2$) produced as a percentage of theoretical yield (based on total organic carbon analysis) is used as a basis for assessing whether the material biodegrades. $CO_2$ is measured by way of a sodium hydroxide trap. The study is run for a minimum of 28 days and may be continued if the yield of $CO_2$ is showing signs of increase towards the end of the 28-day period.

Biodegradation Test—$O_2$ Consumption (OECD 301F) may be used to monitor biodegradation of polymeric materials. OECD 301F is an aquatic aerobic biodegradation test that determines the biodegradability of a material by measuring oxygen consumption. OECD 301F is most often used for insoluble and volatile materials that are challenged by OECD 301B testing. The purity or proportions of major components of the test material is important for calculating the Theoretical Oxygen Demand (ThOD). Like other OECD 301 test methods, the standard test duration for OECD 301F is a minimum of 28 days and can measure ready or inherent biodegradability. A solution or suspension, of the test substance in a mineral medium is inoculated and incubated under aerobic conditions in the dark or in diffuse light. A reference compound (typically sodium acetate or sodium benzoate) is run in parallel to check the operation of the procedures.

There are three classifications of biodegradability: readily biodegradable, inherently biodegradable, and not biodegradable. A material is readily biodegradable if it reaches ≥60% of its theoretical oxygen demand within 28 days. Inherently biodegradable materials also reach the 60% level, but only after the 28-day window has passed. Normally, the test for materials that are readily biodegradable lasts for 28 days, while a prolonged test period may be used to classify materials as inherently biodegradable.

The OxiTop method is modified Sturm method to analyze biodegradation while reporting biodegradability as oxygen consumption, converting the pressure from the $CO_2$ produced during the test to BOD, biological oxygen demand. OxiTop provides precise measurement in an easy to use format for aquatic biodegradation. Biological Oxygen Demand [BOD] was measured over time using an OxiTop® Control OC 110 Respirometer system. This is accomplished by measuring the negative pressure that develops when oxygen is consumed in the closed bottle system. NaOH tablets are added to the system to collect the $CO_2$ given off when 02 is consumed. The $CO_2$ and NaOH react to form $Na_2CO_3$, which pulls $CO_2$ out of the gas phase and causes a measurable negative pressure. The OxiTop measuring heads record this negative pressure value and relay the information wirelessly to a controller, which converts $CO_2$ produced into BOO due to the 1:1 ratio. The measured biological oxygen demand can be compared to the theoretical oxygen demand of each test material to determine the percentage of biodegradation. The OxiTop can be used to screen materials for ready or inherent biodegradability.

Aquatic Biodegradation of CA and CA+PEG400

Aquatic biodegradation rates of cellulose, cellulose acetate (CA) and CA blended with PEG400 were compared using the Oxitop method. Biodegradation refers to mineralization of a substance, or conversion to biomass, $CO_2$ and water by the action of microbial metabolism.

The Test Substances included a cellulose positive control (PC) and cellulose acetate (DS 2.5), both added as powders. CA398-30 is a high-viscosity, high molecular weight cellulose acetate supplied as fine, dry, free-flowing powder. The powder's uniform particle size permits good plasticizer distribution during blending. The average particle size is about 200-250 microns, with a maximum particle size of about 500 microns. The CA resin (CA398-30) was added as the unmodified powder. The CA resin was also uniformly blended with plasticizer (PEG400 at 15%).

Aquatic biodegradation was evaluated essentially as described in OECD 301F test method. Eastman sludge was used as the wastewater inoculum, and the wastewater sample was vacuum filtered to remove solid particles. The test was extended to 56 days from 28 days. The longer duration allows the both the identification of readily biodegradable materials (those which must pass in 28 days), as well as providing a screen for inherently biodegradable materials over a longer test duration. The data is initially collected as BOD measurements (mg/L $O_2$), then the percent Biodegradation is calculated based on the elemental composition of the substance.

TABLE 14

Results for Aquatic Biodegradation of Ex 48 and 49.

| | | % Biodegradation at 28 days | | % Biodegradation at 56 days | |
|---|---|---|---|---|---|
| Ex # | Material | Average | (St dev) | Average | (St dev) |
| Cellulose (control) | Cellulose | 74.79 | | 78.97 | |
| 48 | CA398-30 | 56.23 | | 69.48 | |
| 49 | CA398-30 + 15% PEG400 | 60.23 | (2.05) | 72.58 | (1.25) |

Marine Biodegradation

Marine biodegradation is essential when foam articles are accidentally discharged into waterway and filially floating in ocean. Foam alone is good for photodegradation already. Additional additives can be added to enhance the photodegradation especially when articles float in marine environment.

UV Degradation of Ex 12

Accelerated UV testing indicates foam loses it molecular weight rapidly which may be beneficial for water or marine biodegradation if the article is accidentally released into waterways or ocean. The light weight foam article will float in water so that it will be exposed to UV easily during the day. The breakdown in molecular weight will enhance the disintegration rate of foam and thus marine biodegradation speed.

Ex 12 sample is cut into 4"×6" which is exposed to UV fluorescent having peak radiance of 340 nm at 0.89 watt/$m^2$ intensity for 8 hours @ 60° C. first. Then the UV is off for 4 h at 50° C. with condensed humidity on the vertical sample. The cycles will repeat until reach 168 h (14 cycles) which are equivalent to one-week UV exposure. Some sample will be removed for GPO molecular weight measurement. The rest will continue the UV exposure for another 168 h for two weeks. The original sample (0 week), sample exposed for 1 week, and sample exposed for two weeks are submitted for GPO molecular weight measurements. The normalized MW is the measured MW divided by the original MW which indicates the extent of molecular breakdown due to UV degradation. The original MW is 91,000.

TABLE 15

UV Exposure of Ex 12

| UV Exposure Time (Week) | Normalized MW |
|---|---|
| 0 | 1 |
| 1 | 0.48 |
| 2 | 0.45 |

Additional foams were prepared from various compositions using a small extruder (D=1.5 inch L/D=24) are disclosed in Table 16. The compositions comprise TA (15 wt %, 20 wt %, 25 wt %) and three types of CBAs (HK40B, FZ 95, and FZ 73s) at two loadings (1 wt %, 2 wt %). All compositions contain 1% talc (ABT 1000), supplied by Barretts Minerals. All foams formed from the compositions are 20 mil thick and float in water which is indicative of a good weight reduction from the original density of about 1.30 g/$cm^3$.

TABLE 16

Foaming feasibility using various composition.

| | Composition | | | | Foam |
|---|---|---|---|---|---|
| Ex # | CA | TA (wt %) | CBA (wt %) | Talc (wt %) | Floats in water |
| 13 | CA 398-30 | 15 | HK40B (1) | 1 | Y |
| 14 | CA 398-30 | 15 | HK40B (2) | 1 | Y |
| 15 | CA 398-30 | 15 | FZ 95 (1) | 1 | Y |
| 16 | CA 398-30 | 15 | FZ 95 (2) | 1 | Y |
| 17 | CA 398-30 | 15 | FZ 73S (1) | 1 | Y |
| 18 | CA 398-30 | 15 | FZ 73S (2) | 1 | Y |
| 19 | CA 398-30 | 20 | HK40B (1) | 1 | Y |
| 20 | CA 398-30 | 20 | HK40B (2) | 1 | Y |
| 21 | CA 398-30 | 20 | FZ 95 (1) | 1 | Y |
| 22 | CA 398-30 | 20 | FZ 95 (2) | 1 | Y |
| 23 | CA 398-30 | 20 | FZ 73S (1) | 1 | Y |
| 24 | CA 398-30 | 20 | FZ 73S (2) | 1 | Y |
| 25 | CA 398-30 | 20 | HK40B (1) | 1 | Y |
| 26 | CA 398-30 | 20 | HK40B (2) | 1 | Y |
| 27 | CA 398-30 | 20 | FZ 95 (1) | 1 | Y |
| 28 | CA 398-30 | 20 | FZ 95 (2) | 1 | Y |
| 29 | CA 398-30 | 20 | FZ 73S (1) | 1 | Y |
| 30 | CA 398-30 | 20 | FZ 73S (2) | 1 | Y |

Ex 23 was used in large scale studies on a larger extruder (D=2.5 inch, L/D=30) to further optimize the loading levels (0.7 wt %, 1 wt %, 1.3 wt %) of the chemical foaming agent as shown in Table 17. Ex 12 showed similar results as Ex 23.

The density of Ex 12 was found to be about 0.7 (about 50% weight reduction from 1.30). A film sample of Ex 12 was thermoformed into trays using vacuum.

TABLE 17

20 mil foams using CBA of three different loading levels.

| Ex # | CA | TA (wt %) | CBA (wt %) | Talc (wt %) | Foam Floats in water |
|---|---|---|---|---|---|
| 31 | CA 398-30 | 20 | FZ 73S (0.7) | 1 | Y |
| 12 | CA 398-30 | 20 | FZ 73S (1) | 1 | Y |
| 33 | CA 398-30 | 20 | FZ 73S (1.3) | 1 | Y |

Color Match and HDT Improvement

Ex 34 in Table 15 is a beige color CA foam which already differentiates itself with the ubiquitous white PS foam. To further stand out, Bayferrox 6593 iron oxide, supplied by Lanxess, can be used to match the color of Kraft paper. Furthermore, the texture and touch of CA foam can be modified by any natural fiber such as hemp core fiber (herd) as shown in Table 18, Ex 35. Hemp core fiber, 1 mm long, was supplied by Centralinfiber. The hemp fiber also improves the HOT of the foam about 14° C. @ 0.45 MPa load and 17° C. @ 1.86 MPa load. The HOT is determined by DMA under a specific tensile load at the temperature where 2% elongation of sample occurs.

bioCBA

Commercial CBAs usually use a low melting temperature polymer carrier such PS or PE so that it can be compounded at relatively low temperature with the active blowing agents such as sodium bicarbonate and citric acid so that the blowing agents will not be thermally decomposed prematurely. However, the polymer carrier is not biodegradable and could end up with microplastics in the marine environment. To develop a 100% biodegradable foam without remaining microplastics when the article is accidentally discharged into the ocean, a biodegradable chemical blowing agent is highly desired. Two bioCBAs were made by compounding all ingredients below 150° C. using a twin-screw extruder. Ex 36: 50 wt % BioPBS FD92PM/20 wt % sodium bicarbonate/30 wt % citric acid and Ex 37: 50 wt % CAPA 6500/20 wt % sodium bicarbonate/30 wt % citric acid. BioPBS FD92PM (Mitsubishi Chemical) and CAPA 6500. To ensure the blowing agents sodium bicarbonate and citric acid are still active after compounding, the weight loss using TGA in nitrogen was measured as shown in FIG. 1. Two bioCBAs have similar weight loss up to 20% (from 100% to 80%) around 240° C. The commercial CBA FZ 73S has a different weight loss curve with 20% loss around 230° C. Two foam samples were made using two bio CBAs. The density of foam by using Ex 36 BioPBS FD92PM CBA is 0.6 g/cm$^3$ while 0.4 g/cm$^3$ by using Ex 37 CAPA 6500 CBA. These results indicate 100% biodegradable foam can be produced by utilizing a biodegradable CBA.

TABLE 18

HDT (DMA @ 2% elongation under tensile mode) of Ex 34 & 35 at two different loadings.

| Ex # | Foam Composition/Thickness | Density (g/cm$^3$) | HDT @ 0.45 MPa | HDT @ 1.86 MPa |
|---|---|---|---|---|
| 34 | 30 mil beige color foam CA398-30 + 20% triacetin + 1% FZ 73s | 0.7 | 102 | 81 |
| 35 | 30 mil kraft paper color foam CA398-30 + 20% triacetin + 0.1% iron oxide + 1% FZ 73s + 10% hemp fiber | 0.8 | 116 | 98 |

The hemp fiber reinforced foam also demonstrates high Young's modulus in both machine direction (MO) and transverse direction (TD) for greater rigidity in stackability but lower elongation at break for easier tearing in home composting than its counterpart without fiber as shown in Table 19. Hemp fiber is expected to accelerate the overall degradation of cellulose acetate foams. Based on the results, cellulose acetate foams reinforced with hemp fiber are expected to provide to provide heat resistance and stackability properties that are better suited for hot food applications such as in foamed food containers. Thus, a fiber reinforced foam with higher HDT and stiffness has a performance advantage over the non-reinforced version.

TABLE 19

Mechanical properties of Ex 34 & 35.

| Ex # | Stretching Direction | Thickness (mil) | Yield Stress (MPa) | Yield Strain (%) | Break Stress (MPa) | EOB (%) | Youngs Modulus (MPa) |
|---|---|---|---|---|---|---|---|
| 34 | MD | 30 | 14.49 | 3.67 | 15.89 | 15.4 | 633 |
| | TD | 30 | 9.82 | 5.67 | 9.84 | 5.6 | 428 |
| 35 | MD | 30 | 14.62 | 3.27 | 14.60 | 3.3 | 828 |
| | TD | 30 | 9.49 | 2.49 | 9.49 | 2.5 | 605 |

Foam Using a Physical Blowing Agent

It is much more portable without major capital investments for extruding foam using a CBA. Injection molded foam articles can also be made using a CBA. However, this CBA technology is more suitable for high density foam. For low density foam production such as PS foam, a PBA should be used with a gas injection system.

Extrusion Process for Foams Made from a PBA

The cellulose acetate resin is dried at 60° C. for 4 hours. The resin is then fed into a single screw extruder with a $CO_2$ super critical fluid injector. The extrusion temperature profile is shown in the table below. $CO_2$ is injected directly into the melt. The foam is formed when the melt exits the die.

TABLE 20

Extruder conditions

| Extruder | ° C. |
|---|---|
| Zone 1 | 200 |
| Zone 2 | 205 |
| Zone 3 | 210 |
| Zone 4 | 210 |
| Adapter | 210 |
| Die | 200 |

Table 21 shows the effect of the wt % of carbon dioxide on the density of the foam. As shown, the density of the foams can be adjusted by the amount of carbon dioxide injected. The higher the carbon dioxide loaded, the lower the density of the foam.

TABLE 21

| Foaming Results Using Carbon Dioxide | | | | |
|---|---|---|---|---|
| | $CO_2$ | Density | Thickness | |
| Ex # | (wt %) | (g/cm$^3$) | mil | mm |
| 38 | 0.275 | 0.5 | 61 | 1.55 |
| 39 | 0.35 | 0.45 | 61 | 1.55 |
| 40 | 0.475 | 0.35 | 65 | 1.65 |
| 41 | 0.6 | 0.3 | 63 | 1.6 |
| 42 | 0.8 | 0.25 | 57 | 1.45 |

Examples Using Stabilizers

Materials

Cellulose acetate used was either CA398-30 having a melting point from 230-250° C., and a Tg of about 189° C. or CE41972 having a melting point from 240-260° C., and a Tg of about 180° C. Plasticizers were either TA (Eastman, food grade) or PEG400 (Dow Sentry Polyethylene Glycol 400).

Additives used were BHT; Irganox 1010 (pentaerythritol tetrakis(3-(3,5-di-tert-butyl-4-hydroxyphenyl)propionate from BASF); DLTDP; Weston 705T phosphite (from SI Group), Doverphos S-9228T phosphite (from Dover Chemical), EPSO, and citric acid (from Sigma Aldrich).

Solvent-Casting of Films

Solutions were made containing 12% cellulose acetate in acetone. Plasticizer and additives were included in the solution as indicated. Films (~15 mil) were cast from acetone into flat-bottom aluminum dishes, and solvent evaporation was controlled over 48 h by covering the pans. Film thickness was measured with a digital micrometer (Mitutoyo Digimatic Micrometer, MDC-1" PX) with 0.05 mil resolution.

Screening Solvent-Cast Films

Films were cut into quarters, and the quarters of four different films were laid into a single aluminum dish. A second aluminum dish was stacked on top of the films, and the two aluminum dishes were clamped together with a cup. The aluminum dish assembly was placed in an oven set at 200° C. for one hour, then removed and avowed to cool to room temperature. The films were removed from the aluminum dish assembly, and the color was measured using a CR-400 Chroma Meter from Konica Minolta to determine L*, a*, and b*.

Compounding of Material

Cellulose acetate was compounded with plasticizer and optionally additives to make pellets. Specific formulations are listed in the tables below. Compounding was done using a Leistriz 18 mm twin screw extruder. The screw RPM was typically about 560, although it varied from 416 to 584 RPM, The torque ranged from 26.7 to 50%. The melt temperature ranged from 255-275° C. The melt pressure ranged from 412-580 psi. The SEI ranged from 0.147 to 0.326. The barrel has 9 zones, set in a gradient from about 64° C. to about 240° C. The material was extruded through a die set at 235-250° C.

Injection Molding of Plaques

Plaques were injection molded using a Toyo injection molding machine to form 4"×4"×125 mil plaques. The compounded pellets were first dried at 60-65° C. for 1-6 h before used. The barrel had 5 zones, which were set at 500-465° F. in most instances (460-450° F. for one set of plaques). The mold cooling was set at 120° F., or for some sets of plaques at 70° F. Two different cycle times were used for most sets of plaques; a "regular" cycle time of ~39 seconds, as well as a "doubled" cycle time of about 78 seconds.

Color Measurement

Color values reported herein are CIELAB L*, a*, and b* values measured following ASTM 6290-98 and ASTM E308-99, using measurements from a CR-400 Chroma Meter from Konica Minolta, Unless stated otherwise, the measurements were performed on injection molded plaques having a thickness of 125 mils.

Examples of CA398-30 with 20 wt % (Ex. 43) and 15 wt % PEG400 (Ex 44)

Formulations of CA398-30/PEG400 with various additives were injection molded into 125 mil plagues, and the b* was measured with a colorimeter. Plaques were made by 2 methods, using a normal cycle time during injection molding and by doubling the cycle time during injection molding (as discussed above). The data are presented in Tables 22 and 23 below.

TABLE 22

| Color (b*) of 125 mil plaques of CA398-30 with 20% PEG400 and various additives. | | | | | |
|---|---|---|---|---|---|
| 125 mil plaques of CA398-30/PEG400 20 wt % | | | | Regular | 2× |
| | Primary AO | Secondary AO | Acid scavenger | cycle time | cycle time |
| Ex # | (wt %) | (wt %) | (wt %) | b*g | b* |
| 43-1 | BHT (0.25) | | Vikoflex 7170 (1) | — | 15.3 |
| 43-2 | BHT (0.5) | | Vikoflex 7170 (1) | 8.0 | 13.3 |
| 43-3 | Irganox 1010 (0.5) | | Vikoflex 7170 (1) | 9.0 | 11.8 |
| 43-4 | | | Vikoflex 7170 (1) | 7.2 | 12.3 |
| 43-5 | BHT (0.5) | | | — | 12.0 |
| 43-6 | BHT (0.25) | | Vikoflex 7170 (1) | 8.4 | 11.2 |
| 43-7 | Irganox 1010 (0.3) | Weston 705T (0.5) | | 5.8 | 7.8 |
| 43-8 | BHT (0.25) | DLTDP (0.2) | | 6.6 | 10.1 |
| 43-9 | Irganox 1010 (0.3) | Doverphos S-9228T (0.15) | | 5.8 | 6.6 |
| 43-10 | | | | 8.6 | 12.4 |

TABLE 23

| Color (b*) of 125 mil plaques of CA398-30 with PEG400 (15 wt %) and various additives. | | | | | |
|---|---|---|---|---|---|
| | 125 mil plaques of CA398-30/PEG400 15% | | | Regular | 2× |
| | Primary AO | Secondary AO | Acid scavenger | cycle time | cycle time |
| Ex # | (wt %) | (wt %) | (wt %) | b* | b* |
| 44-1 | | | | 9.9 | 14.6 |
| 44-2 | Irganox 1010 (0.3) | | | 10.8 | 14.8 |
| 44-3 | | Doverphos S-9228T (0.15) | | 6.6 | 8.6 |
| 44-4 | Irganox 1010 (0.3) | Doverphos S-9228T (0.15) | | 7.3 | 9.1 |
| 44-5 | BHT (0.25) | Doverphos S-9228T (0.15) | | 8.1 | 9.9 |
| 44-6 | Irganox 1010 (0.3) | | Vikoflex 7170 (1) | 10.7 | 14.5 |
| 44-7 | | Doverphos S-9228T (0.15) | Vikoflex 7170 (1) | 7.3 | 9.1 |
| 44-8 | Irganox 1010 (0.3) | Doverphos S-9228T (0.15) | Vikoflex 7170 (1) | 7.5 | 9.2 |
| 44-9 | Irganox 1010 (0.15) | Doverphos S-9228T (0.08) | Vikoflex 7170 (1) | 8.2 | 11.4 |
| 44-10 | | Doverphos S-9228T (0.08) | Vikoflex 7170 (1) | 8.9 | 12.1 |
| 44-11 | citric acid (0.1) - material was sticking, could not make plaques | | | | |

A review of Tables 22 and 23 reveals that the presence of the acid scavenger (Vikoflex 7170) does not seem to have a large effect on color. Although not shown in the tables, it was observed that the Vikoflex sometimes resulted in increased haze in thicker parts. Also, the primary antioxidant alone (BHT or Irganox 1010) appears to have little effect on color, with some data showing it may have resulted in a slight increase in color. However, the presence of the secondary antioxidants provided a significant reduction in b*.

Examples of CE41972 with 17 wt % PEG400 (Ex 45)

Formulations with various additives were initially screened by making solvent cast films (as described above). The results of screening indicated that the CE41972/PEG400 combination with no additives resulted in much higher color than either CE41972/TA or CA398-30/PEG400 formulations. Also, the addition of Vikoflex 7170 resulted in a further slight increase in b* and the primary antioxidant alone appeared to have little effect on b*. However, the secondary antioxidant alone (DLTDP or Weston 705T) resulted in significant reduction of b* and citric acid alone reduced b*, while the secondary antioxidant (DLTDP or Weston 705T) combined with citric acid reduced b* more than either alone, combining DLTDP and Weston 705T reduced b* more than either alone, and combining DLTDP and Weston 705T and citric acid reduced b* slightly more than when using only 2 of the 3.

Based on the screening results, formulations of CE41972/PEG400 with various additives were injection molded into 125 mil plaques, and the b* was measured with a colorimeter. The data are presented in Tables 24 and 25 below.

TABLE 24

| Observed color of 125 mil plaques of CE41972 with 17 wt % PEG400 (or 17 wt % TA as a comparison) and various additives. | | | | | |
|---|---|---|---|---|---|
| | 125 mil plaques of CE41972 | | | | Regular |
| | Plasticizer | Antioxidant #1 | Antioxidant #2 | Citric Acid | cycle time |
| Ex # | (wt %) | (wt %) | (wt %) | (wt %) | Color |
| 45-1 | TA (17) | | | | dark yellow |
| 45-2 | PEG400 (17) | | | | very dark brown |
| 45-3 | PEG400 (17) | Weston 705T (0.5) | | | dark brown |
| 45-4 | PEG400 (17) | Weston 705T (0.5) | DLTDP (0.1) | | Brown |
| 45-5 | PEG400 (17) | Weston 705T (0.5) | | 0.1 | pale yellow |
| 45-6 | PEG400 (17) | Weston 705T (0.5) | DLTDP (0.1) | 0.1 | pale yellow |
| 45-7 | PEG400 (17) | Doverphos S-9228T (0.15) | | | dark brown |
| 45-8 | PEG400 (17) | Doverphos S-9228T (0.15) | DLTDP (0.1) | | Brown |

TABLE 24-continued

| Observed color of 125 mil plaques of CE41972 with 17 wt % PEG400 (or 17 wt % TA as a comparison) and various additives. | | | | | |
|---|---|---|---|---|---|
| | 125 mil plaques of CE41972 | | | | Regular |
| Ex # | Plasticizer (wt %) | Antioxidant #1 (wt %) | Antioxidant #2 (wt %) | Citric Acid (wt %) | cycle time Color |
| 45-9 | PEG400 (17) | Doverphos S-9228T (0.15) | | 0.1 | pale yellow |
| 45-10 | PEG400 (17) | Doverphos S-9228T (0.15) | DLTDP (0.1) | 0.1 | pale yellow |

TABLE 25

| Measured color values for Ex 45. | | | |
|---|---|---|---|
| | Color Values | | |
| Ex # | L* | a* | b* |
| 45-1 | 78.6 | 0.1 | 37.3 |
| 45-2 | 20.3 | 11.2 | 5.5 |
| 45-3 | 45.5 | 22.1 | 44.7 |
| 45-4 | 57.2 | 15.2 | 53.8 |
| 45-5 | 82.4 | −2.2 | 26.5 |
| 45-6 | 84.2 | −2.5 | 23.8 |
| 45-7 | 44.6 | 21.8 | 40.1 |
| 45-8 | 51.7 | 18.8 | 51.0 |
| 45-9 | 83.4 | −2.5 | 25.8 |
| 45-10 | 82.9 | −2.7 | 24.7 |

A review of Tables 24 and 25 reveals that the plaque results validate the screening results, and show that for the CE41972/PEG400 combination, the lowest color is achieved when both a phosphite antioxidant (Doverphos S-9228T or Weston 705T) and citric acid are included and that the color can be further improved slightly by adding DLTDP (an additional secondary antioxidant) to the phosphite antioxidant.

Examples of CE41972 with 17 wt % TA (Ex 46)

Formulations of CE41972/TA with various additives were injection molded into 125 mil plaques, and the b* was measured with a colorimeter for plaques made using regular and double cycle times (as discussed above). The data are presented in Tables 26 and 27 below.

TABLE 26

| Color (b*) of 125 mil plaques of CE41972 with 17 wt % TA and various additives. | | | | |
|---|---|---|---|---|
| | 125 mil plaques of CE41972/TA 17 wt % | | Regular | 2× |
| Ex # | Primary AO (wt %) | Secondary AO (wt %) | cycle time b* | cycle time b* |
| 46-1 | | | — | 48.0 |
| 46-2 | Irganox 1010 (0.3) | Weston 705T (0.3) | 26.2 | 31.7 |
| 46-3 | BHT (0.25) | DLTDP (0.2) | 32.6 | 48.6 |

A review of Table 26 reveals that not all antioxidant combinations result in reduction of b* in molded plaques. A combination of BHT and DLTDP did not reduce b*, whereas a combination of Irganox 1010 and Weston 705T did.

TABLE 27

| Color (b*) of 125 mil plaques of CE41972 with 17 wt % TA and various additives. | | | | |
|---|---|---|---|---|
| | 125 mil plaques of CE41972/TA 17 wt % | | Regular | 2× |
| Ex # | Primary AO (wt %) | Secondary AO (wt %) | cycle time b* | cycle time b* |
| 46-4 | | | 41.0 | 52.0 |
| 46-5 | Irganox 1010 (0.3) | Doverphos S-9228T (0.15) | 29.5 | 33.2 |
| 46-6 | Irganox 1010 (0.3) | Weston 705T 0.4% | 28.7 | 34.3 |
| 46-7 | | Doverphos S-9228T 0.15% | — | 37.4 |
| 46-8 | | Weston 705T 0.4% | 33.5 | 38.4 |

A review of Table 27 reveals that either of the secondary phosphite antioxidants Doverphos S-9228T or Weston 705T, when paired with the primary antioxidant Irganox 1010, resulted in a large decrease in b*. Surprisingly, in contrast to CA/PEG400 (Table 23), the secondary antioxidants by themselves did not reduce color quite as much.

Examples of CA398-30 Comparing 15 wt % PEG400 and 15 wt % TA (Ex. 47)

A series of plaques were made with either PEG400 or TA as plasticizer, including either a secondary antioxidant only, or a primary and secondary antioxidant combined, by injection molding plaques using regular and double cycle times (as described above). The results are presented in Table 28.

TABLE 28

Color (b*) of 125 mil plaques of CA398-30 with 15 wt % plasticizer (either TA or PEG400) and various additives.

| 125 mil plaques of CA398-30 | | | | Regular | 2× |
|---|---|---|---|---|---|
| | Plasticizer | Primary AO | Secondary AO | cycle time | cycle time |
| Ex # | (wt %) | (wt %) | (wt %) | b* | b* |
| 47-1 | PEG400 (15) | | | 9.2 | 12.3 |
| 47-2 | PEG400 (15) | | Weston 705T (0.5) | 6.9 | 8.8 |
| 47-3 | PEG400 (15) | | Doverphos S-9228T (0.15) | 6.5 | 8.2 |
| 47-4 | PEG400 (15) | Irganox 1010 (0.3) | Doverphos S-9228T (0.15) | 6.7 | 7.9 |
| 47-5 | TA (15) | | | 14.6 | 21.7 |
| 47-6 | TA (15) | | Weston 705T (0.5) | 13.2 | 19.1 |
| 47-7 | TA (15) | | Doverphos S-9228T (0.15) | 12.2 | 16.7 |
| 47-8 | TA (15) | Irganox 1010 (0.3) | Doverphos S-9228T (0.15) | 11.0 | 15.0 |

A review of Table 28 reveals that there was a difference based on which plasticizer was used. Both combinations (CA398-30/PEG400 and CA398-30/TA) had significantly reduced color when a secondary antioxidant was added. However, addition of Irganox 1010 had no benefit when using PEG400 (Ex 47-4), whereas addition of Irganox 1010 resulted in some additional reduction in color when using TA (Ex 47-8).

Examples 50 to 57—Disintegration of Compounded CA398-30 Compositions with Plasticizer and Polymeric Additives For each of the examples, CA398-30 was compounded with TA, (1 wt %) EPSO, and one or more biopolymers and then extruded into a film or injection molded into a plaque. The biopolymers used were PHB(6)Hx and CAPA 6500.

The film or plaque was either made by a two-step process or a one-step process. For the two-step process, the material is pre-compounded on a twin-screw extruder and then extruded on a single screw extruder or molded in an injection molding machine. For the one step process, the materials were made by physical blending pellets and then completing the extrusion on a single screw extruder. All materials were dried prior to molding and extrusion at a temperature of 60° C. in a desiccant drying system.

Ex 50-53 films were prepared using the two-step process, where the material was pre-compounded on a Leistritz 18 mm twin screw extruder at 180 to 200° C. at a rate of 15 lbs/hr. at a screw speed of 500 rpm. The material was then extruded on a 1.5" Killion extruder having a L/D of 24:1 and using a general-purpose screw with a maddock mixing section. The material was processed at a profile of 200° C. to 215° C. on the barrel and 225 to 230° C. on the die to make a 0.020 inch (20 mil or about 0.5 mm) film. Ex 56 and 57 were made the same way, except a die was used to make a 0.030 inch (30 mil or about 0.76 mm) film.

Ex 54 film was prepared using the one-step process, where the material was physically blended and then extruded on a 1.5" Killion extruder having a L/D of 24:1 and using a general-purpose screw with a maddock mixing section. The material was processed at a profile of 200° C. to 215° C. on the barrel and 225 to 230° C. on the die to make a 0.020 inch (20 mil or about 0.5 mm) film.

Ex 55 plaques were prepared using the two-step process and injection molding, where the material was pre-compounded on a Leistritz 18 mm twin screw extruder at 180 to 200° C. at a rate of 15 lbs/hr. at a screw speed of 500 rpms. The material was then molded on a 90-ton Toyo Injection molding machine. The material was processed at a profile of 210° C. on the barrel and a mold temperature of 20° C. on the mold to make a 0.060 inch (60 mil or about 1.5 mm) plaque.

Film or plaque samples were subject to pilot-scale aerobic composting tests in a similar manner to the tests conducted as described for Ex 1 and 2. The specific formulations used for each example and the disintegration test results are shown below in Table 29.

TABLE 29

Formulation information for CA398-30 with triacetin and biopolymers.

| | CA398-30 | TA | PHB(6)Hx | CAPA 6500 | Thickness | % Disintegration | |
|---|---|---|---|---|---|---|---|
| Ex # | (wt %) | (wt %) | (wt %) | (wt %) | (mil) | 6 wks | 12 wks |
| 50 | 72 | 17 | 10 | 0 | 20 | >20 | >75 |
| 51 | 62 | 17 | 20 | 0 | 20 | >2 | >99 |
| 52 | 62 | 27 | 10 | 0 | 20 | >8 | >99 |
| 54 | 52 | 27 | 20 | 0 | 20 | 0 | >50 |
| 54 | 52 | 17 | 20 | 10 | 20 | >99 | >99 |
| 55 | 52 | 17 | 20 | 10 | 60 | 0 | >50 |

TABLE 29-continued

Formulation information for CA398-30 with triacetin and biopolymers.

| Ex # | CA398-30 (wt %) | TA (wt %) | PHB(6)Hx (wt %) | CAPA 6500 (wt %) | Thickness (mil) | % Disintegration 6 wks | 12 wks |
|---|---|---|---|---|---|---|---|
| 56 | 52 | 17 | 20 | 10 | 30 | >35 | >99 |
| 57 | 62 | 17 | 0 | 20 | 30 | >15 | >99 |

A review of table 29 reveals that the lower amount (10 wt %) of PHB(6)Hx (compared to a higher amount at 20 wt %) resulted in higher disintegration for higher levels of TA (27 wt %). The combination of the two biopolymers resulted in good disintegration after 12 weeks for 17 wt % TA at both 20 and 30 mils thickness and greater than 50% disintegration at 60 mils thickness. Also, 20 wt % CAPA 6500 alone resulted in good disintegration after 12 weeks for 17 wt % TA at 30 mils thickness.

What I claim is:

1. A foamable composition, comprising:

(1) a cellulose acetate having a degree of substitution of acetyl ($DS_{Ac}$) between 2.2 to 2.6;

(2) 5 to 40 wt % of a plasticizer;

(3) 0.1 to 3 wt % of a nucleating agent; and (4) 0.1 to 3 wt % a chemical blowing composition, comprises:

(i) 25 to 75 wt % of a blowing agent, and (ii) 25 to 75 wt % of a carrier polymer having a melting point that is no more than 150° C., wherein the proportions of the blowing agent and the carrier polymer are based on the total weight of the chemical blowing composition, wherein the proportions of the plasticizer, nucleating agent and chemical blowing composition are based on the total weight of the foamable composition, wherein the blowing agent comprises sodium bicarbonate, citric acid or a combination thereof, wherein the carrier polymer comprises a polybutylene succinate, a polycaprolactone, or combinations thereof, and wherein the nucleating agent comprises a particulate composition with a median particle size less than 2 microns, and wherein the nucleating agent comprises a magnesium silicate, a silicon dioxide, a magnesium oxide, or combinations thereof.

2. The foamable composition of claim 1, wherein the plasticizer comprises triacetin, triethyl citrate, or PEG400.

3. The foamable composition of claim 1, wherein the foamable composition further comprises a biodegradable fiber.

4. The foamable composition of claim 3, wherein the biodegradable fiber comprises hemp, bast, jute, flax, ramie, kenaf, sisal, bamboo, or wood cellulose fibers.

5. The foamable composition of claim 1, wherein the foamable composition is biodegradable.

6. The foamable composition of claim 1, wherein the foamable composition comprises two or more cellulose acetates having different degrees of substitution of acetyl.

7. The foamable composition of claim 1, wherein the foamable composition further comprises a biodegradable polymer that is different than the cellulose acetate.

8. An article prepared from the foamable composition of claim 1, wherein the article is a foam.

9. The article of claim 8, wherein the article has a thickness of up to 6 mm.

10. The article of claim 8, wherein the article has one or more skin layers.

11. The article of claim 8, wherein the article is biodegradable.

12. The article of claim 8, wherein the article has a density less than 0.9 $g/cm^3$.

13. The article of claim 8, wherein the article is industrial compostable or home compostable.

14. The article of claim 13, wherein the article has a thickness of up to 3 mm.

15. The article of claim 8, wherein the article exhibits greater than 90% disintegration after 12 weeks according to ISO 16929 dated 2013.

* * * * *